US011577410B2

(12) United States Patent
Preuss et al.

(10) Patent No.: US 11,577,410 B2
(45) Date of Patent: Feb. 14, 2023

(54) CONTROL MECHANISMS AND METHODS OF TOOL-HOLDING ARM FOR EXOSKELETONS

(71) Applicant: Ekso Bionics, Inc., Richmond, CA (US)

(72) Inventors: Adam Preuss, Santa Rosa, CA (US); Chris Meadows, Richmond, CA (US); Kurt Amundson, Berkeley, CA (US); Russ Angold, American Canyon, CA (US); James Lubin, Oakland, CA (US); Mario Solano, Richmond, CA (US); Tom Mastaler, Hercules, CA (US); Nicholas Fleming, Oakland, CA (US); Matt Sweeney, Sacramento, CA (US)

(73) Assignee: Ekso Bionics, Inc., Richmond, CA (US)

( * ) Notice: Subject to any disclaimer, the term of this patent is extended or adjusted under 35 U.S.C. 154(b) by 1244 days.

(21) Appl. No.: 16/071,303

(22) PCT Filed: Jan. 20, 2017

(86) PCT No.: PCT/US2017/014342
§ 371 (c)(1),
(2) Date: Jul. 19, 2018

(87) PCT Pub. No.: WO2017/127683
PCT Pub. Date: Jul. 27, 2017

(65) Prior Publication Data
US 2019/0291285 A1 Sep. 26, 2019

Related U.S. Application Data
(60) Provisional application No. 62/280,896, filed on Jan. 20, 2016.

(51) Int. Cl.
B25J 19/00 (2006.01)
B25J 9/00 (2006.01)
(Continued)

(52) U.S. Cl.
CPC ......... *B25J 19/0016* (2013.01); *B25J 9/0006* (2013.01); *B25J 19/0012* (2013.01);
(Continued)

(58) Field of Classification Search
CPC .. B25J 9/0006; B25J 19/0008; B25J 19/0012; B25J 19/0016; F16M 2200/044
See application file for complete search history.

(56) References Cited

U.S. PATENT DOCUMENTS 3,449,769 A * 6/1969 Mizen .................. A61F 2/54
623/66.1
4,208,028 A 6/1980 Brown et al.
(Continued)

FOREIGN PATENT DOCUMENTS

CN 201806802 4/2011
FR 2870317 11/2005
FR 2870317 A1 * 11/2005 ............. F16M 11/04

OTHER PUBLICATIONS

Machine Translation of FR2870317 reference (Year: 2005).*

*Primary Examiner* — Jake Cook
(74) *Attorney, Agent, or Firm* — Diederiks & Whitelaw, PLC

(57) ABSTRACT

A tool-holding arm includes a plurality of links and a tool coupling that removably secures a tool to the tool-holding arm. A first fluid spring provides a gravity-counteracting force to the tool-holding arm. A locking mechanism selectively locks the first fluid spring. An adjustment mechanism selectively adjusts an amount of the gravity-counteracting force provided by the first fluid spring.

20 Claims, 30 Drawing Sheets

(51) Int. Cl.
*B65G 7/12* (2006.01)
*B65G 9/00* (2006.01)
*B65G 47/91* (2006.01)

(52) U.S. Cl.
CPC .................. *B65G 7/12* (2013.01); *B65G 9/00* (2013.01); *B65G 47/91* (2013.01); *B65G 2207/08* (2013.01); *B65G 2207/30* (2013.01); *B65G 2207/40* (2013.01); *F16M 2200/044* (2013.01)

(56) References Cited

U.S. PATENT DOCUMENTS

| | | |
|---|---|---|
| 4,591,122 A | 5/1986 | Kreuzer |
| 5,802,638 A | 9/1998 | Parker et al. |
| 7,618,016 B2 | 11/2009 | Brown |
| 8,945,028 B2 | 2/2015 | Kazerooni et al. |
| 9,132,557 B2 * | 9/2015 | Yamada ................ B66C 23/005 |
| 9,884,421 B2 | 2/2018 | Garrett et al. |
| 2004/0255711 A1 | 12/2004 | Takenaka et al. |
| 2011/0266323 A1 | 11/2011 | Kazerooni et al. |
| 2018/0042803 A1 * | 2/2018 | Amundson ................ B25J 9/14 |

* cited by examiner

CONTROL MECHANISMS AND METHODS OF TOOL-HOLDING ARM FOR EXOSKELETONS

CROSS REFERENCE TO RELATED APPLICATIONS

This application represents a National Stage application of PCT/US2017/014342, filed Jan. 20, 2017, which claims the benefit of U.S. Provisional Patent Application Ser. No. 62/280,896, which was filed on Jan. 20, 2016 and titled "Devices for Improving the Utility of Human Exoskeletons". The entire content of these applications are incorporated herein by reference.

FIELD OF THE INVENTION

The present invention relates to devices and methods that augment a wearer's carrying capacity and strength, increasing performance and aiding in the prevention of injury during the execution of certain load-bearing or strength-requiring tasks. More particularly, the present invention relates to control mechanisms and methods suitable for use by a person engaging in heavy tool use or weight-bearing tasks, particularly in combination with an exoskeleton device, which potentiate improved function of the person's appendages for activities including, but not limited to, granting greater strength and endurance in the wearer's arms and allowing for heavy tool use over extended periods of time.

BACKGROUND OF THE INVENTION

Wearable exoskeletons have been designed for medical, commercial and military applications. Medical exoskeletons are designed to help restore a user's mobility. Commercial and military exoskeletons help prevent injury and augment the user's strength. Commercial and military exoskeletons are used to alleviate loads supported by workers or soldiers during strenuous activities, thereby preventing injuries and increasing their stamina and strength.

Exoskeletons designed for use by able-bodied wearers often act to improve the wearer's stamina by transferring the weight of a tool or load through the exoskeleton structure and into the ground, decreasing the weight borne by the wearer. In some cases, tool-holding exoskeletons are outfitted with a non-anthropomorphic tool-holding arm that supports the weight of the tool, reducing user fatigue by providing tool-holding assistance. The tool-holding arm transfers the vertical force required to hold the tool through the exoskeleton-supported tool-holding arm rather than through the user's arms and body. In other cases, the exoskeleton structure is generally anthropomorphic and acts in tandem with the user's body to support some or all of the tool weight by supporting the positioning of the wearer's arms and then transferring that tool weight around the body of the wearer and into the ground. Weight-bearing exoskeletons transfer the weight of the exoskeleton load through the legs of the exoskeleton rather than through the user's legs. In some cases, weight-bearing exoskeletons are designed to carry a specific load, such as a heavy backpack. In other cases, military weight-bearing exoskeletons support the weight of armor. Commercial and military exoskeletons can have actuated joints that augment the strength of the exoskeleton user, with these actuated joints being controlled by the exoskeleton control system, and with the exoskeleton user using any of a plurality of possible input means to command the exoskeleton control system.

In powered exoskeletons, exoskeleton control systems prescribe and control trajectories in the joints of an exoskeleton, resulting in the movement of the structure of the exoskeleton and, in some cases, the positioning of a tool supported by the exoskeleton. These control trajectories can be prescribed as position-based, force-based or a combination of both methodologies, such as those seen in impedance controllers. Position-based control systems can be modified directly through modification of the prescribed positions. Force-based control systems can also be modified directly through modification of the prescribed force profiles. As exoskeleton users and exoskeleton tools vary in proportion, variously adjusted or customized powered exoskeletons will fit each user somewhat differently. The exoskeleton control system can take these differences in exoskeleton user proportion, exoskeleton configuration/customization, exoskeleton user fit and tool support into account to make changes to prescribed exoskeleton trajectories. The exoskeleton user can control changes in exoskeleton trajectories through communication with the exoskeleton control system using any of a variety of means, including but not limited to body pressure sensors, joysticks, touchpads, gestural sensors, voice sensors and sensors that directly detect nervous system activity.

In unpowered tool-holding exoskeletons, the exoskeleton wearer provides the force to move the exoskeleton structure and any affixed tools, with the exoskeleton aiding the wearer by supporting the weight of tools in certain positions, aiding in certain tool or exoskeleton movements and transferring the weight of tools around the body of the wearer, through the leg structures of the exoskeleton and into the support surface.

In both powered and unpowered tool-holding exoskeletons, the design of the exoskeleton structure, and in particular the structure of the tool-holding arm and tool-holding arm attachment point or the structure of the anthropomorphic arm that aids in tool support, plays a significant role in the usefulness of the exoskeleton to the wearer in tool use applications. The specific structure of the exoskeleton arm or tool support structure is variably suitable to specific tools and specific motions that the wearer may engage in. Examples of non-anthropomorphic tool-holding arms known in the art include the zeroG® and Steadicam® arms. These unpowered arms have a mechanism that includes one or more spring members that act to compensate for the weight of the tool or camera attached to the end of the arm, supporting the weight of the attached device while allowing the person guiding the arm to easily reposition the arm and attached device as needed.

FIGS. 1A and 1B illustrate a support apparatus of the prior art which was originally devised to obtain stabilized motion picture film and video images and which was offered for sale under the trademark Steadicam®. See also U.S. Pat. Nos. 4,208,028 and 7,618,016. As illustrated, the support arm for the apparatus includes a pair of parallel upper arms links 102, 104, which are pivotally coupled at one end to a connector hinge bracket 106. The other ends of upper arm links 102, 104 are pivotally coupled to an upper arm medial hinge bracket 108. A second pair of parallel forearm links 110, 112 is pivotally coupled between a forearm medial bracket 114 and a camera support bracket 116. A camera mounting pin 117 is provided in the camera support bracket 116. Upper arm medial hinge bracket 108 and forearm medial bracket 114 are rotatably coupled together along one side by a hinge 118. Connector hinge bracket 106 is rotatably coupled at its center to one end of a lower support hinge plate 120. The other end of lower support hinge plate 120 is rotatably coupled to a fixed support block 122 by a pin 123. A spring 121, through which pin 123 extends, biases lower support hinge plate 120 in a clockwise direction. One end of a tension spring 124 is coupled to the end of upper arm link 102, which is pivotally coupled to upper arm medial hinge bracket 108. The other end of tension spring 124 is coupled to one end of a tension spring 126 by a section of cable 128 which rides on and around a pulley 130 which is rotatably coupled to upper arm link 102. The other end of tension spring 126 is coupled to one end of a tension spring 132 by a section of cable 134 which rides on and around a pulley 136 which is rotatably coupled to upper arm link 104. The other end of tension spring 132 is coupled to the end of upper arm link 104 adjacent to connector hinge bracket 106. Similarly, one end of a tension spring 138 is coupled to the end of forearm link 110 adjacent to camera mounting bracket 116. The other end of tension spring 138 is coupled to a tension spring 140 by a cable 142 which rides on and around a pulley 144 which is rotatably coupled to forearm link 110. The other end of tension spring 140 is coupled to one end of a tension spring 146 by a cable 148 which rides on and around a pulley 150 which is rotatably coupled to forearm link 112. The other end of tension spring 146 is coupled to the end of forearm link 112 adjacent to forearm medial hinge bracket 114.

A weight, such as a camera, which is supported at support bracket 116 behaves as an object in free space beyond gravity since the upward forces that tension springs 124, 126, 132, 138, 140 and 146 exert, in effect, counteract gravity. The weight tends to travel in a straight line until influenced otherwise and tends to retain the same angle until influenced otherwise. As a result, upper arm links 102, 104 roughly correspond to the upper arm of the user and forearm links 110, 112 roughly correspond to the user's forearm in terms of their three-dimensional geometry as the support arm is used either high, low or to either side. The user can adjust the position of the support arm by exerting force against the tool with the user's arms, which will move the support arm relative to his or her body. Due to the gravity-counteracting action of the support arm, the user does not bear the weight of a stationary camera/tool or support arm but rather only exerts force when changing the position of the support arm relative to the user's body. Similar support arms are known in the art and are seen in objects such as lamps or the support arms for medical x-ray devices. In some embodiments, the springs are replaced by gas springs or other similar devices, which serve the same role of applying a gravity-counteracting force to the weight-supporting arm.

Since the upward forces which support arm tension springs 124, 126, 132, 138, 140 and 146 exert support the weight supported at support bracket 116, the forces of the tension springs should be matched to the weight of the object supported at support bracket 116. This requires changes to the spring force if a different object is attached that has a different weight in order to match upwards and downwards forces and result in a "weightless" object attached to the gravity-compensating arm. Thus, changing the camera or tool attached to the end of the support arm results in a change of the arm-supported weight and requires an alteration in the forces exerted by the tension springs. FIG. 2A diagrammatically shows two positions of the lifting triangle ABC incorporated within a parallelogram support linkage (with the previously shown tool support arm having two such parallelogram support linkages). A resilient member 203 forms a side of the force-exerting triangle, which is here shown as lifting triangle ABC. Resilient member 203 is here shown, therefore, as a tension spring. In this illustration, a side 201 is in both positions contiguous with a fixed side 205, and a spring attachment point 219 is located on the line between point A and a pivot 226. In order to exactly counter a weight throughout the potential excursion of parallelogram 202, 204, 205, 206 as shown, the tensioning assembly would require the spring rate specified by the formula $K=P/Dy$, where K is the spring rate, P is the load and Dy is the height of side 201. The tension spring would only fit within the available diagonal distance BC as shown if an impractically high spring rate and an impractically low value for side 201 were employed (e.g., if P were 40 lbs, a spring rate of 160 lbs/inch would exactly counter P if the length of side 201 was 0.25 inches). If the length of side 201 were increased, the weight of P would necessarily increase proportionately to remain in equilibrium with the lifting force of triangle ABC.

The prior art also includes a method and device to change the lifting power of the force-exerting triangle, in which the termination point is adjusted to change the length of the third side of the force-exerting triangle. See U.S. Pat. No. 7,618,016. The termination point is further adjusted in a direction that is substantially perpendicular to the first adjustment direction so, as the load arm pivots about the load pivot, the termination point location can cross a substantially plumb line passing through the load pivot to alter the equipoising contour over at least part of the pivotal excursion of the load arm. FIG. 2B diagrammatically illustrates an exemplary mechanism to adjust spring termination height and offset from a side 225 and further diagrams a novel way to equipoise load P using a tensioning assembly of a rate that is inappropriate according to the above formula $K=P/Dy$ but is useful for other reasons. The tensioning assembly can, for example, be specified to fit within the diagonal space of a parallelogram without the high spring rate and low aspect ratio that would otherwise be called for. If a termination point 239 of a spring 223 is displaced outside of adjacent side 225 of the parallelogram formed by sides 222, 224, 225 and 226, the lifting force becomes generally less efficient as the parallelogram is moved both upward and downward from the level attitude shown, which is known in the art to provide an approximation of equipoise. Embodiments of the present invention introduce a mechanism to adjustably vary this offset in a manner that remains proportional to the changing height of the lifting triangle. A path 238 of potential spring termination points is angularly displaced from a line 241, an extension of side 225, by means of a Dx lead screw 234 which is adjusted by a knob 236 to arcuately pivot a side 221 (path 238) at a pivot point A and thus offset spring termination point 239 with respect to side 225, which is here shown to be vertical. In addition, a Dy adjusting knob 235 turns a lead screw 233 to raise and lower spring termination point 239 along spring termination path 238 in order to increase or decrease the lifting force of the triangle ABC.

FIG. 2C is a side view of the complete two-segment gravity-compensating support arm of the prior art. Support body mounting hardware 298 is pivotally attached to an upper arm segment 290, which is pivotally attached via a hinge 292 to a forearm segment 294, which is adapted for connection to the payload (such as a camera) using a post 296. Note that if the arm were inverted, post 296 and body mounting hardware 298 could simply be interchanged and the arm would lift appropriately.

In both powered and unpowered tool-holding exoskeletons, the design of the exoskeleton structure, and in particular the structure of the lower portion of the exoskeleton, plays an important role in transferring the weight of the exoskeleton load, including both the tool weight and the tool-supporting arm weight, around the body of the wearer and into the support surface. In addition to simply supporting this weight, the design of the lower structure of an exoskeleton determines how well this weight can be balanced—with the balance affecting the usefulness of the exoskeleton and/or tool to the user. For example, consider an exoskeleton with a hip-mounted tool-holding arm. As the tool and tool-holding arm are extended further from the body of the exoskeleton wearer, the tool-holding arm will act as a lever, and the weight of the tool will result in an increasing torque being exerted on the exoskeleton hip. To counteract this hip torque, the exoskeleton (and/or the wearer) must expend energy, and as the weight of the tool is extended away from the exoskeleton this results in a less-balanced exoskeleton that is more likely to fall over. Issues of balance and undesired joint torque can be addressed by making exoskeleton frames and joints heavier and more rigid or by adding weighted counterbalance arms that extend behind the exoskeleton (opposite the tool-holding arm they balance). However, these solutions come at the cost of making exoskeletons increasingly less mobile and/or less agile, and mobility and flexibility are key functions of tool-holding exoskeletons (relative to, for example, bench/floor mounted tools or tracked vehicles). Thus, the design of exoskeleton support structures, and in particular the lower structures including hip, leg, ankle and foot structures, as well as the interconnecting joints, should take into account the tradeoff between load support/balance and exoskeleton mobility/maneuverability. Depending on the application of the tool-holding exoskeleton, the relative importance of different exoskeleton characteristics can vary.

Tool-holding exoskeletons with powered joints are capable of assisting a wearer in a number of ways. For example, a powered tool arm can assist the worker in lifting a tool, powered legs can assist the wearer in walking with the weight of a tool or load and a powered hip can assist in exoskeleton balance by counteracting the torque exerted by the weight of a tool mounted on an extended tool-holding arm. However, tool-holding exoskeletons with unpowered joints have some substantial advantages over exoskeletons with powered joints, including, but not limited to, reduced exoskeleton cost, simplified maintenance requirements and, importantly, lack of dependence on a power source or supply for exoskeleton operation. Well-designed tool-holding exoskeletons with unpowered joints still provide tool support through gravity compensation using devices such as zeroG® arms and assist in exoskeleton balance through mechanisms that counteract or transfer hip torque resulting from tool arm weight, largely removing the need for powered joints in such tool-holding exoskeletons. Still, there are uses for power in tool-holding exoskeletons other than actuating exoskeleton joints. For example, U.S. Pat. No. 7,618,016 as referenced above, describes a gravity-compensating tool-holding arm, with the spring force in the spring members in the tool arm being adjustable such that the arm can support tools or cameras with differing weights. While the device described in U.S. Pat. No. 7,618,016 is configured to be adjusted manually by the user, who can change the angle and length of each spring member depending upon the weight supported by the tool arm, these adjustments can alternatively be performed by one or more computer-controlled motors.

There exists an unmet need in the art to provide a range of devices and methods that allow the use of powered devices on human exoskeletons for functions other than exoskeleton joint actuation, with these devices improving the utility of the tool-holding exoskeleton to the wearer. There exists an unmet need to provide a device and method that allows for the automatic and rapid adjustment of a gravity-compensating tool-holding arm in response to the changing of a supported tool or tool weight. There exists a further unmet need to provide a device and method that allows for a tool-holding arm to be locked into a fixed position, allowing the wearer to lean into the tool and apply greater force into the tool. There exists a further unmet need to provide a device and method that allows for the changing of the position of an exoskeleton counterbalance/outrigger, improving the balance of the exoskeleton. There exists a further unmet need to provide a device and method that allows for improved walking mobility in exoskeletons equipped with hip torque-counteracting devices. There exists a further unmet need to provide a device and method that allows for an exoskeleton to supply power directly to supported tools. There exists a further unmet need to provide a device and method that allows an exoskeleton to supply consumables, such as fasteners, directly to tools. There exists a further unmet need to provide a device and method that allows for an exoskeleton to regulate the temperature of the exoskeleton wearer.

Disclosed herein are devices that improve human exoskeleton balance, maneuverability and tool use support capacity for both powered and unpowered exoskeletons. These enhancements to exoskeleton balance, maneuverability and tool use allow wearers of human exoskeletons to more effectively work with tools and move the exoskeleton and tool in complex environments.

SUMMARY OF THE INVENTION

It is an object of the present invention to provide a device that allows for an exoskeleton-mounted, gravity-compensating tool-holding arm to be rapidly adjustable such that the tool-holding arm can quickly be mounted with different tools of varying weights, with this tool-holding arm retaining effective gravity compensation at these variable tool weights, allowing the exoskeleton wearer to easily manipulate the position of these tools without having to support the tool weight. It is also an object of the present invention to provide a device that allows for an exoskeleton wearer to selectively fix the position of a tool-holding arm relative to the position of the exoskeleton, wearer and tool mounted on the tool-holding arm, allowing the exoskeleton wearer to lean into the tool-holding arm so as to apply force into the tool through the tool-holding arm.

It is an additional object of the present invention to provide a device that allows for improved walking mobility for an exoskeleton equipped with a hip-torque transfer device. It is an additional object of the present invention to provide a device that allows for balance of an exoskeleton equipped with an adjustable counterbalance. It is an additional object of the present invention to provide a device that allows for an exoskeleton to provide consumables to tools or other attached devices. It is an additional object of the present invention to provide a device that allows for thermoregulation of an exoskeleton wearer.

Concepts were developed to utilize an exoskeleton control system to control motors attached to spring tension adjustment devices in a gravity-compensating, tool-holding exoskeleton arm, with the exoskeleton control system adjusting spring tension in order to compensate for changing tool weight affixed to the tool-holding arm, with the exoskeleton control system receiving input from the exoskeleton wearer through a control interface and/or using data received from exoskeleton sensors regarding the weight of the affixed tool. Concepts were also developed to integrate a lockable member, such as a lockable gas spring, into a gravity-compensating tool-holding exoskeleton arm such that the exoskeleton wearer can selectively fix the position of the tool-holding arm and tool relative to the exoskeleton wearer, allowing the exoskeleton wearer to lean into the exoskeleton tool-holding arm and transfer force into a tool. Concepts were further developed to integrate linked gas springs into the exoskeleton tool-holding arm, allowing for simplified adjustment of the spring rate of the tool-holding arm.

Concepts were further developed to incorporate an actuated device into an exoskeleton equipped with a hip-torque transfer device, with this actuated device selectively increasing or decreasing tension on a tensile member, allowing for greater mobility when walking but maintaining hip-torque transfer when the exoskeleton tool arm is in use. Concepts were further developed to actuate the position of an exoskeleton counterbalance or outrigger, allowing for improved exoskeleton balance. Concepts were further developed to affix power storage, transfer or generation systems to an exoskeleton, with these power systems providing power for tools or other devices supported by or attached to the exoskeleton. Concepts were further developed to equip an exoskeleton with a consumable-feeding device allowing the exoskeleton to replenish consumables, such as fasteners including but not limited to rivets or nails, to exoskeleton-mounted tools. Concepts were further developed to equip an exoskeleton device with environmental regulations systems providing for the heating or cooling of an exoskeleton wearer. Concepts were further developed to equip an exoskeleton with a device that provides a purified breathing air supply to the exoskeleton wearer.

In particular, the present invention is directed to a tool-holding arm comprising a plurality of links and a tool coupling configured to removably secure a tool to the tool-holding arm. A first fluid spring is configured to provide a gravity-counteracting force to the tool-holding arm. A locking mechanism is configured to lock the first fluid spring, and an adjustment mechanism is configured to adjust an amount of the gravity-counteracting force provided by the first fluid spring. Preferably, the first fluid spring is a hydraulic or pneumatic spring including a first rod, a first plunger and a first cylinder.

In one embodiment, the locking mechanism is a valve configured to control a flow of a fluid into and out of the first cylinder. The valve includes a stem and a seat. When the stem contacts the seat, the valve is in a closed position in which the valve prevents the fluid from flowing into and out of the first fluid spring. When the stem does not contact the seat, the valve is in a fully or partially open position in which the valve does not prevent the fluid from flowing into and out of the first fluid spring. In one embodiment, the tool-holding arm further comprises a tensioning spring, and the first fluid spring is located within the tensioning spring.

In one embodiment, the adjustment mechanism includes a second rod, a second plunger, a second cylinder and a fluid conduit. The fluid conduit is configured to transfer a fluid between the second cylinder and the first cylinder. A position of the second plunger within the second cylinder determines the amount of the gravity-counteracting force provided by the first fluid spring. Preferably, the adjustment mechanism further includes a motor configured to control the position of the second plunger within the second cylinder. The locking mechanism is a valve configured to control a flow of the fluid within the fluid conduit. Preferably, the tool-holding arm further comprises a second fluid spring configured to provide the gravity-counteracting force to the tool-holding arm. The second fluid spring includes a third rod, a third plunger and a third cylinder. The fluid conduit is further configured to transfer the fluid between the second cylinder and the third cylinder. The position of the second plunger within the second cylinder determines the amount of the gravity-counteracting force provided by the second fluid spring.

In one embodiment, the tool-holding arm is part of an exoskeleton. The exoskeleton includes a hip structure and a thigh link coupled to the hip structure at a hip joint. A shank link is coupled to the thigh link at a knee joint, and a foot structure is coupled to the shank link at an ankle joint. When the exoskeleton is supported on a support surface, a weight of the exoskeleton is transferred from the hip structure to the support surface through the thigh link, shank link and foot structure. Preferably, the exoskeleton further includes a rear structure. When the exoskeleton is worn by a user, the rear structure is located behind the user. The adjustment mechanism is coupled to the rear structure. In one embodiment, the exoskeleton further includes an electronic control system configured to control the locking mechanism or the adjustment mechanism.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention, which may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1A:
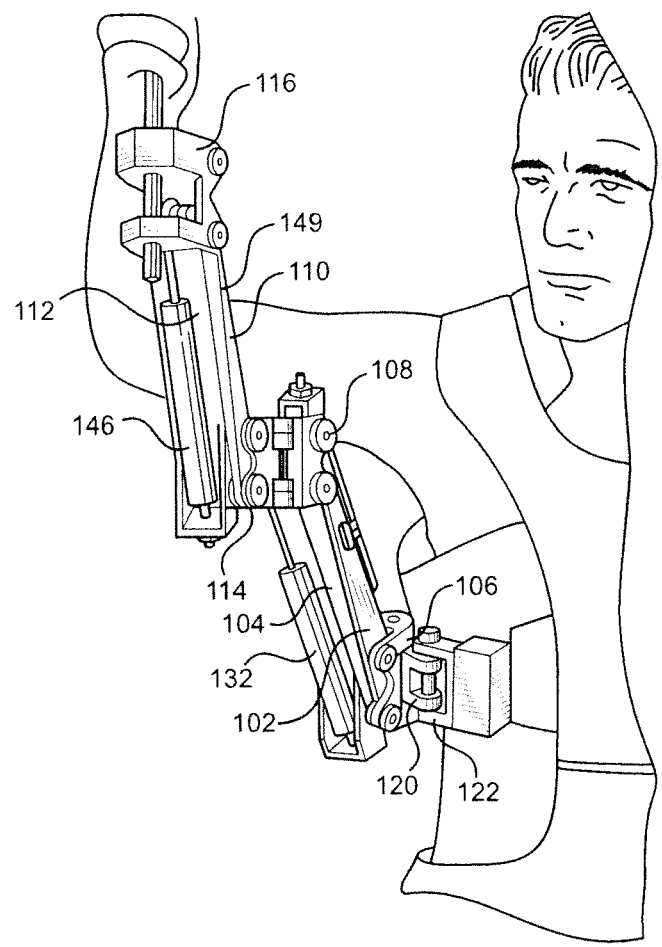
FIG. 1A shows a prior art non-anthropomorphic gravity-compensating support arm.
Figure 1B:
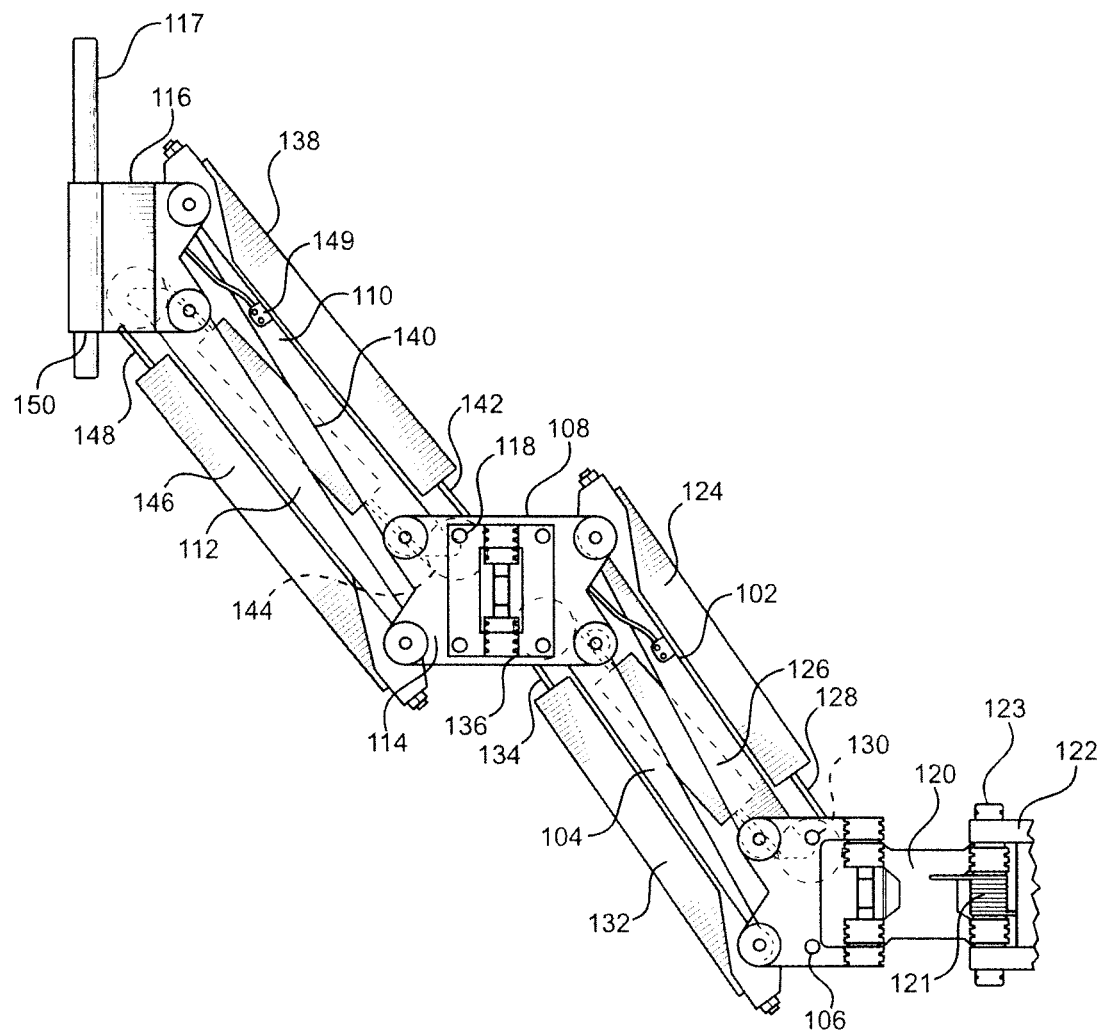
FIG. 1B shows the prior art non-anthropomorphic gravity-compensating support arm of FIG. 1A.
Figure 2A:
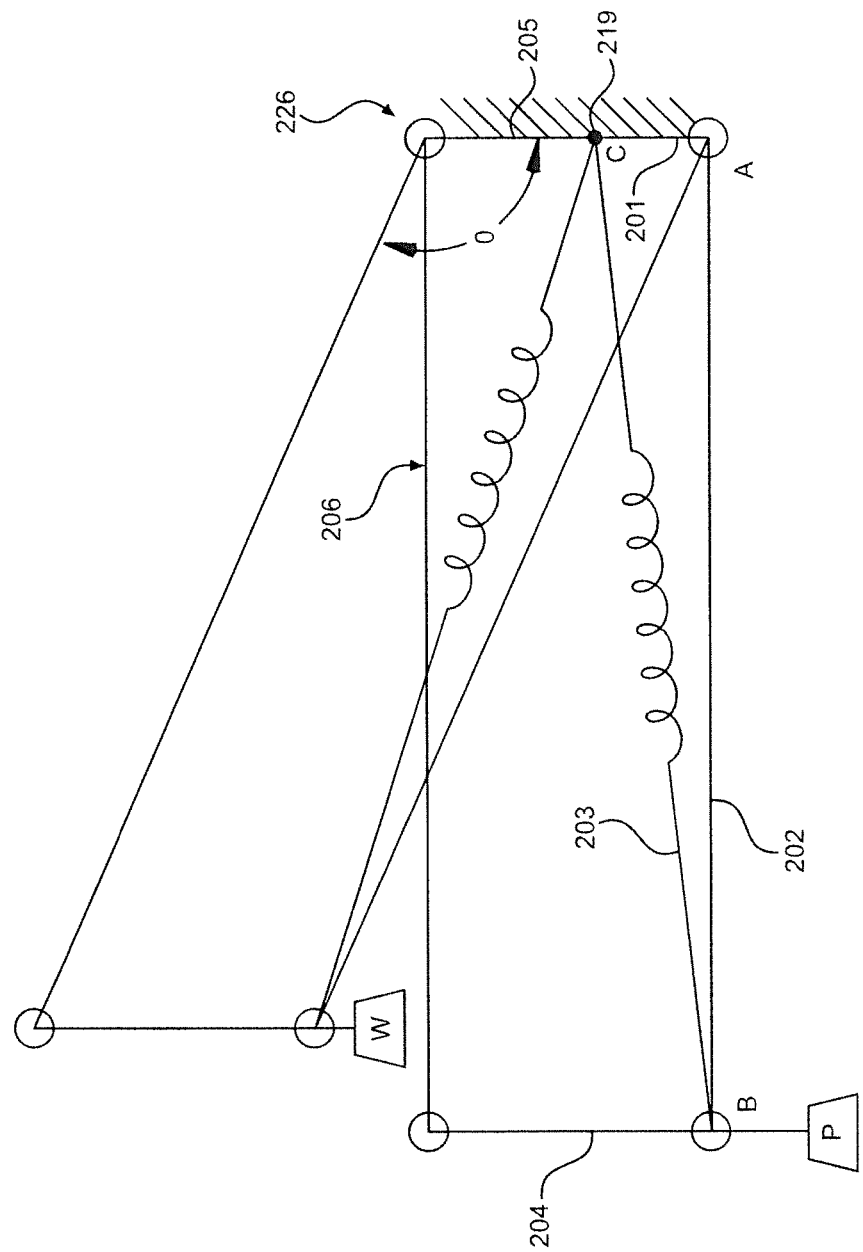
FIG. 2A is a diagram of a lifting triangle ABC incorporated within a parallelogram support linkage of a gravity-compensating tool-holding arm of the prior art.
Figure 2B:
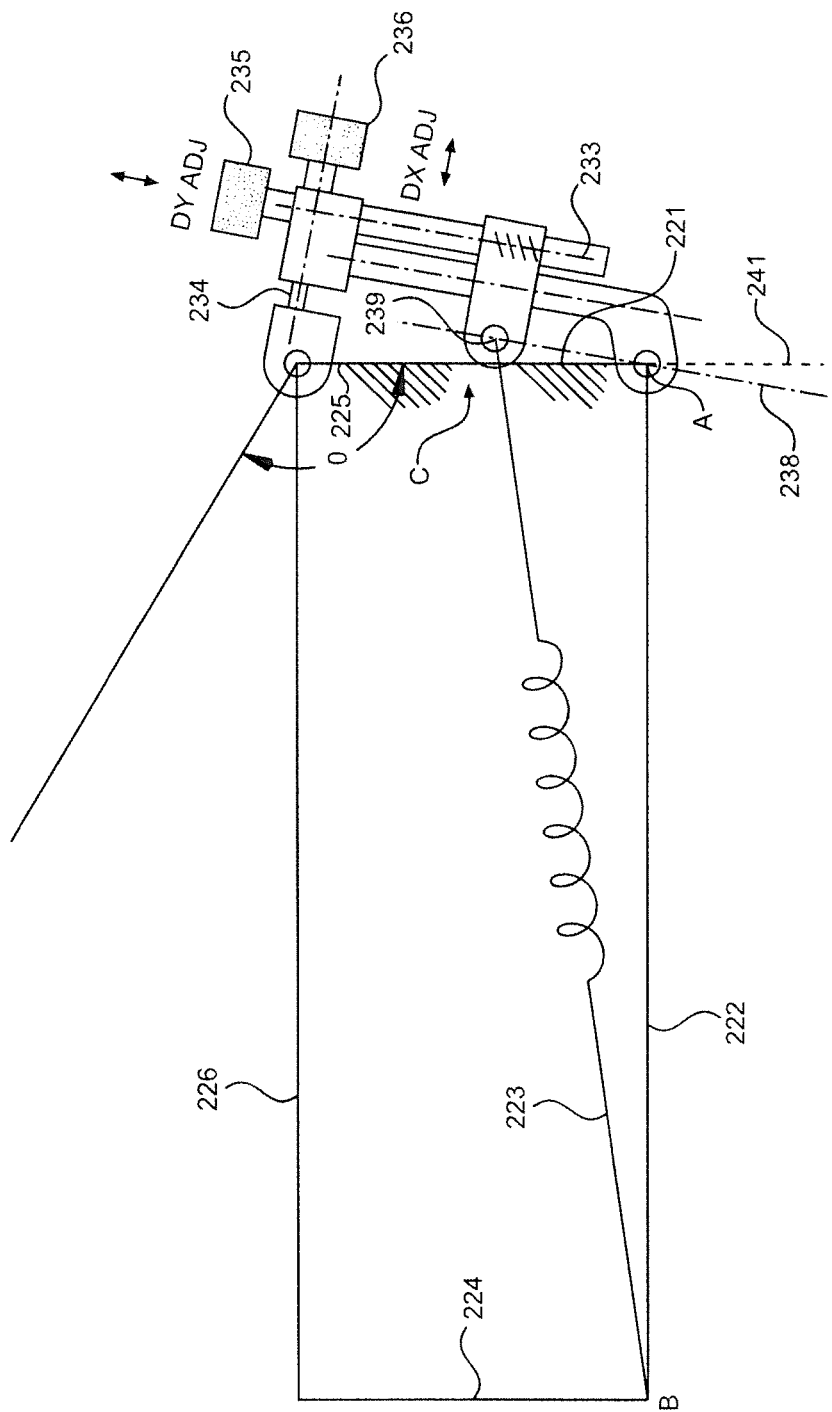
FIG. 2B is a diagram of DY and DX adjustments of the spring termination height and offset from vertical within a parallelogram support linkage of a gravity-compensating tool-holding arm of the prior art.
Figure 2C:
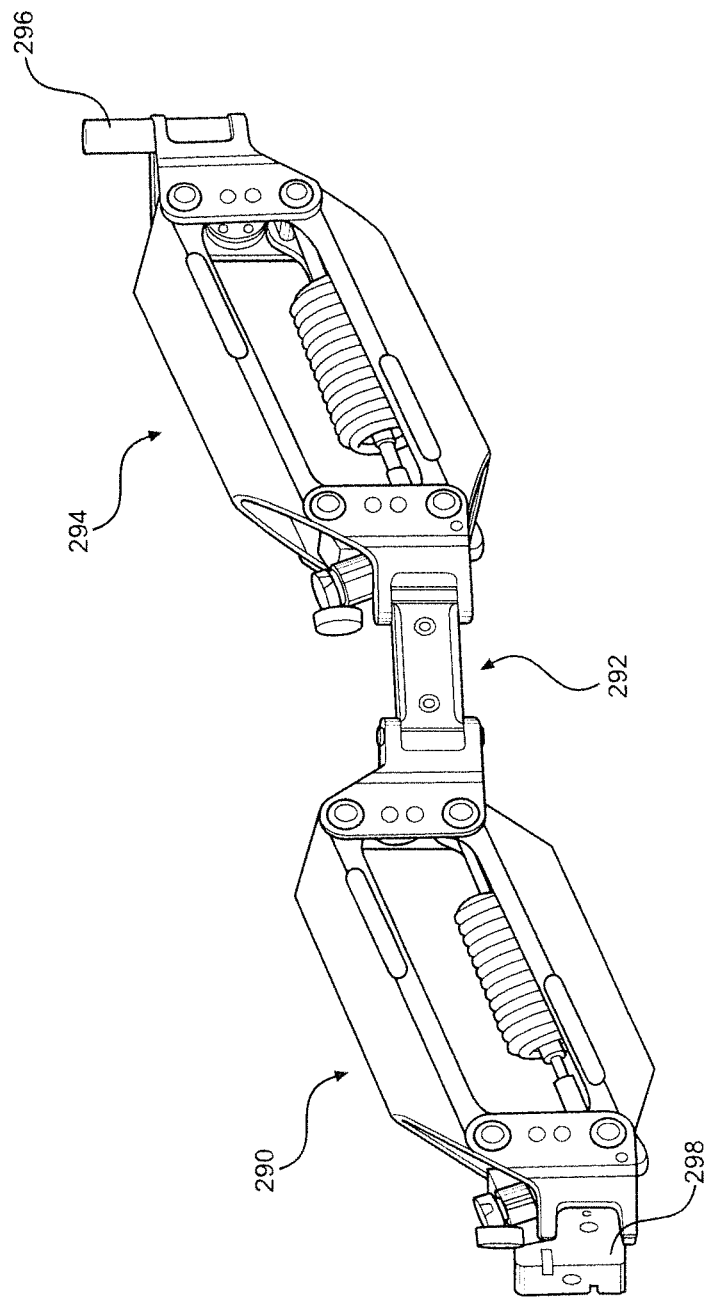
FIG. 2C is a side view of a two-segment gravity-compensating tool-holding arm of the prior art.
Figure 3A:
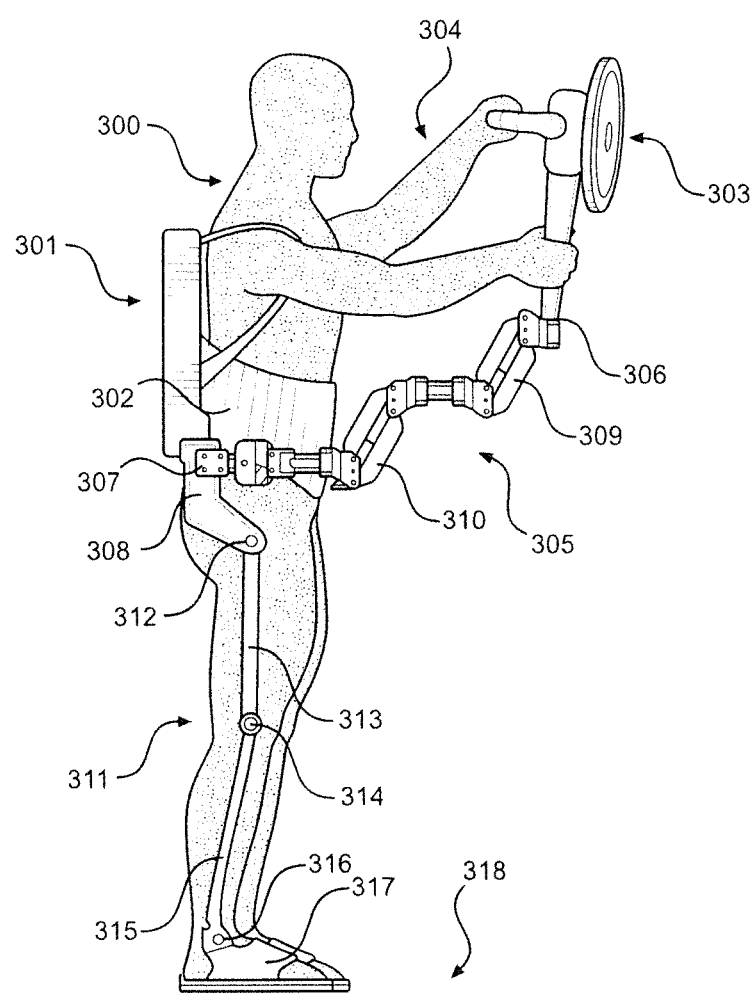
FIG. 3A is a side view of a worker wearing an exoskeleton constructed in accordance with a first embodiment of the present invention, the exoskeleton being equipped with a hip-mounted, non-anthropomorphic, gravity-compensating tool-holding arm device and tool.

FIG. 3A shows a person 300 wearing a tool-holding exoskeleton 301 constructed in accordance with a first embodiment of the present invention. Exoskeleton 301 is equipped with a gravity-compensating tool-holding arm 305 and is attached to exoskeleton wearer 300 by strapping 302. A hip structure 308 of exoskeleton 301 is connected to tool-holding arm 305 at a hip coupling 307, with tool-holding arm 305 connecting to and supporting the weight of a tool 303 at a tool coupling 306. Tool-holding arm 305 is composed of an upper tool arm link 309 and a lower tool arm link 310, with the tool arm links of tool-holding arm 305 being flexibly connected such that they are movable relative to each link so as to allow exoskeleton wearer 300 to use arms 304 to change the position of tool 303 relative to exoskeleton 301 and exoskeleton wearer 300. The weight of tool 303 is transferred through tool coupling 306 to upper tool arm link 309, then to lower tool arm link 310, then to hip coupling 307 and into hip structure 308 of exoskeleton 301. Hip structure 308 is rotatably connected to a thigh link 313 at a hip 312, with thigh link 313 being rotatably connected to a shank link 315 at a knee 314, with shank link 315 being rotatably connected to a foot structure 317 at an ankle 316. This connectivity allows the weight of exoskeleton 301, tool 303 and tool-holding arm 305 to be transferred around legs 311 of exoskeleton wearer 300, through hip structure 308, through thigh link 313 and shank link 315, into foot structure 317 and ultimately to a support surface 318. Exoskeleton wearer 300 can also walk while wearing exoskeleton 301, with exoskeleton 301 continuing to support the weight of tool 303 and tool-holding arm 305.

Figure 3B:
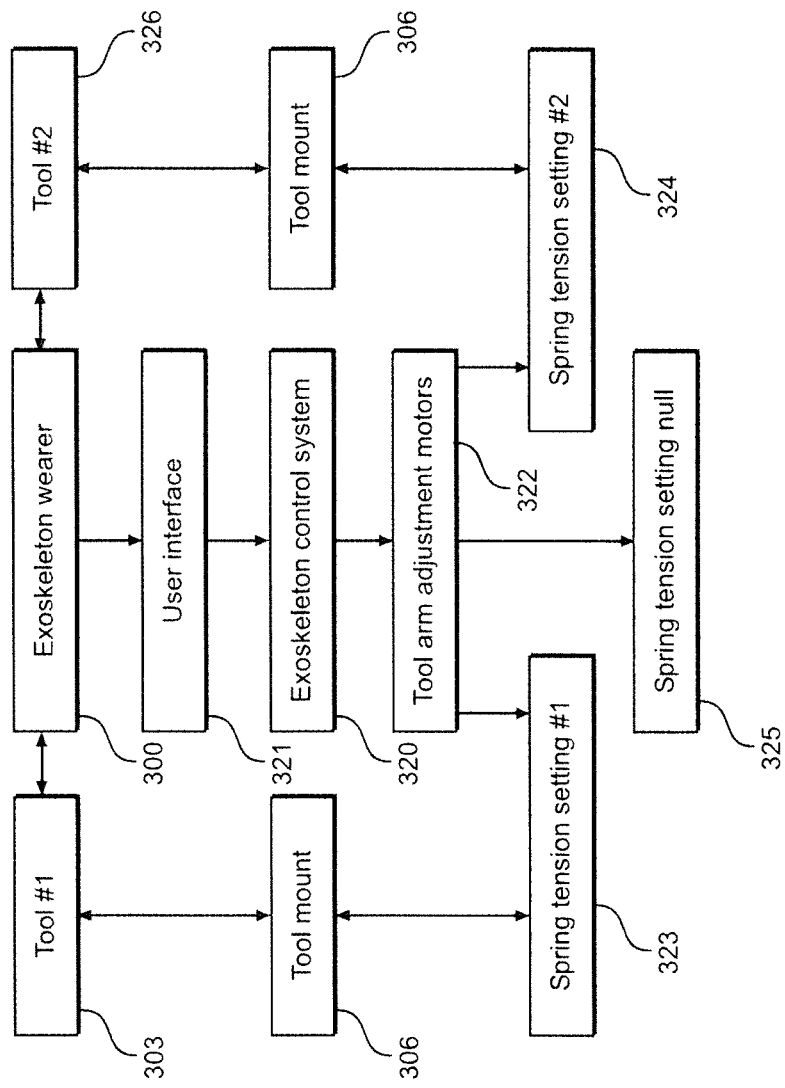
FIG. 3B is a box diagram of the systems in communication in the first embodiment in which the spring tension in the tool-supporting arm is adjusted by the exoskeleton control system as needed for changing tool weight.
Figure 3C:
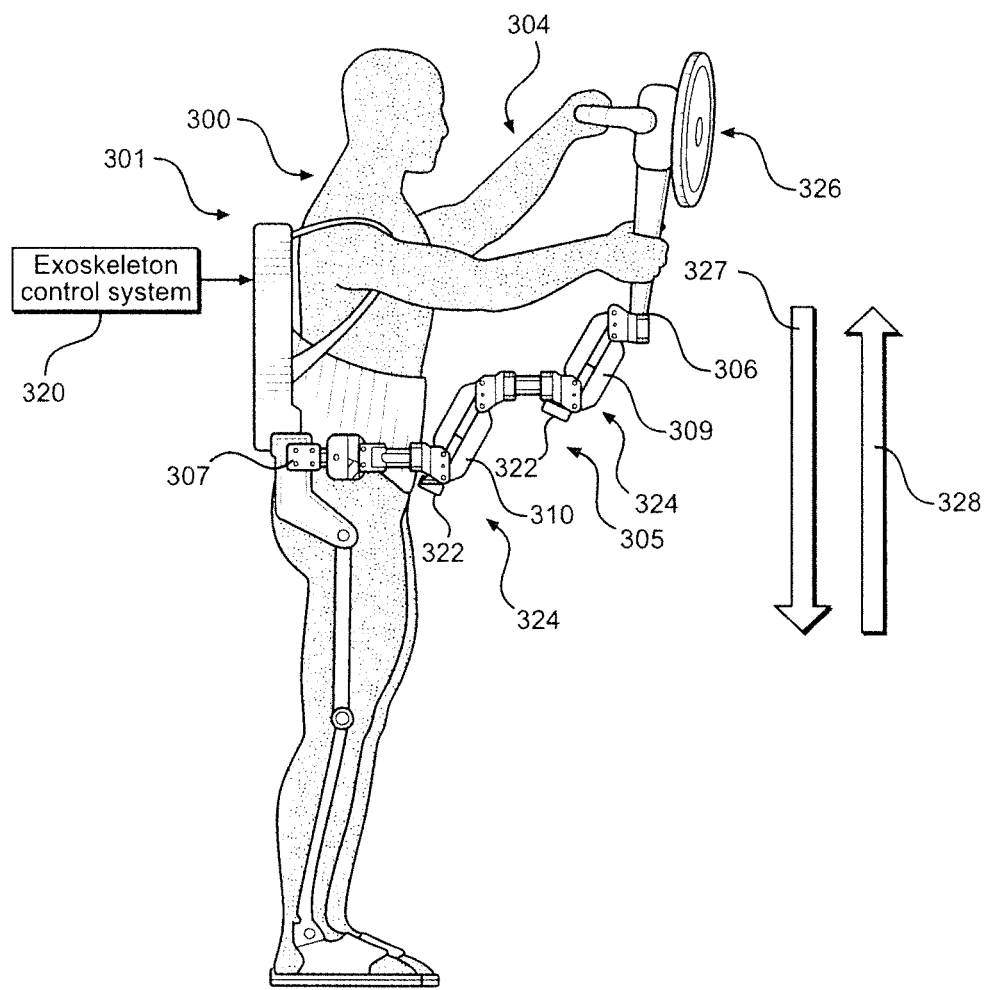
FIG. 3C is a side view of the worker and exoskeleton of FIG. 3A.

FIG. 3B is a box diagram showing the systems in communication in the first embodiment. Exoskeleton wearer 300 uses a user interface 321 to command an exoskeleton control system 320 to direct tool arm adjustment motors 322 based on the identity of the tool, or lack of a tool, affixed to tool mount 306 to adjust tool arm spring tension appropriately for the weight of the tool in order to achieve gravity compensation. For example, exoskeleton wearer 300 uses tool 303 affixed to tool mount 306 with a first spring tension setting 323, resulting in gravity compensation for tool 303 and allowing exoskeleton wearer 300 to manipulate the position of tool 303 without supporting the weight of tool 303. In order to change tools, exoskeleton wearer 300 uses user interface 321 to command exoskeleton control system 320 to signal tool arm adjustment motors 322 to change the tool arm spring tension settings to a null spring tension setting 325 (for the weight of no attached tool). Exoskeleton wearer 300 then removes tool 303 from tool mount 306, affixes a second tool 326 to tool mount 306 and commands exoskeleton control system 320, via user interface 321, to signal tool arm adjustment motors 322 to set a second spring tension setting 324, resulting in gravity compensation for tool 326 and allowing exoskeleton wearer 300 to manipulate the position of tool 326 without supporting the weight of tool 326. FIG. 3C shows exoskeleton wearer 300 using arms 304 to manipulate tool 326, with a weight 327 of tool 326 being offset by a lifting force 328 resulting from spring tension 324 in tool-holding arm 305.

Figure 3D:
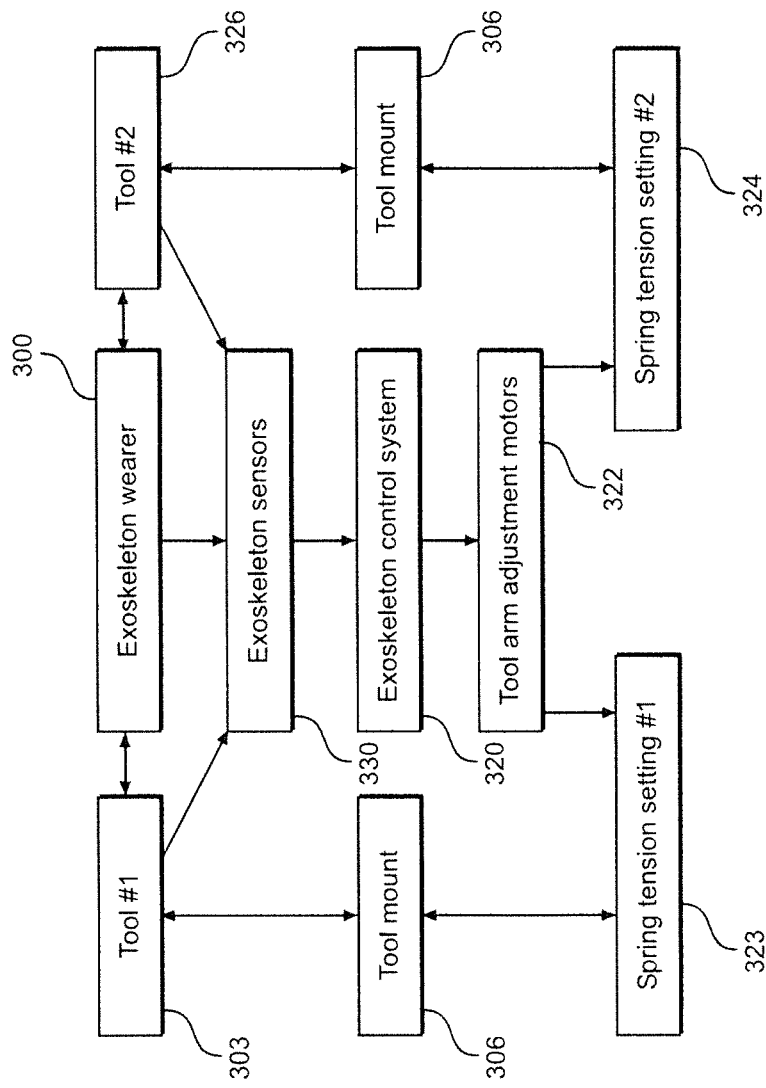
FIG. 3D is a box diagram of the systems in communication in one preferred variation of the first embodiment.

FIG. 3D is a box diagram showing one preferred variation of the first embodiment in which exoskeleton sensors 330 receive information from or about the tools affixed to the exoskeleton, allowing exoskeleton control system 320 to automatically set the parameters for tool arm adjustment motors 322 to set optimal spring tension for gravity compensation for a specific tool. In other words, rather than wearer 300 using user interface 321 to select first spring tension setting 323 for first tool 303 and second spring tension setting 324 for second tool 326 (as shown in FIG. 3B), exoskeleton sensors 330 receive information from or about first tool 303 and second tool 326 and pass this information to exoskeleton control system 320, which uses the information to automatically select first spring tension setting 323 for first tool 303 and second spring tension setting 324 for second tool 326. In some embodiments, the user interface is a touchscreen device. In some embodiments, the user interface is a button, switch, knob or other input means. In some embodiments, the user interface receives verbal commands from the wearer. In some embodiments, the wearer selects a specific tool from a preset list shown in the user interface. In some embodiments, the wearer specifies a specific tool weight. In some embodiments, the wearer manually adjusts the spring tension until a desired gravity compensation is reached. In some embodiments, the exoskeleton sensors identify a tool using radio-frequency ID tags, Bluetooth beacons, optical markers (such as bar codes) or other communication means known in the art. In some embodiments, the exoskeleton sensors measure pressure or position with time in order to directly measure the weight of the tool so as to determine optimal spring tension settings for gravity compensation.

As an example of the first embodiment, consider a construction worker wearing a tool-holding exoskeleton. Over the course of a shift, this worker needs to alternate between use of a spot welder, a rivet setting tool and a concrete saw. Through use of the device of the first embodiment, the worker can rapidly switch between these tools, allowing a single tool-holding arm to support each tool in the execution of labor as needed without requiring time consuming manual adjustments of spring tension.

Figure 4A:
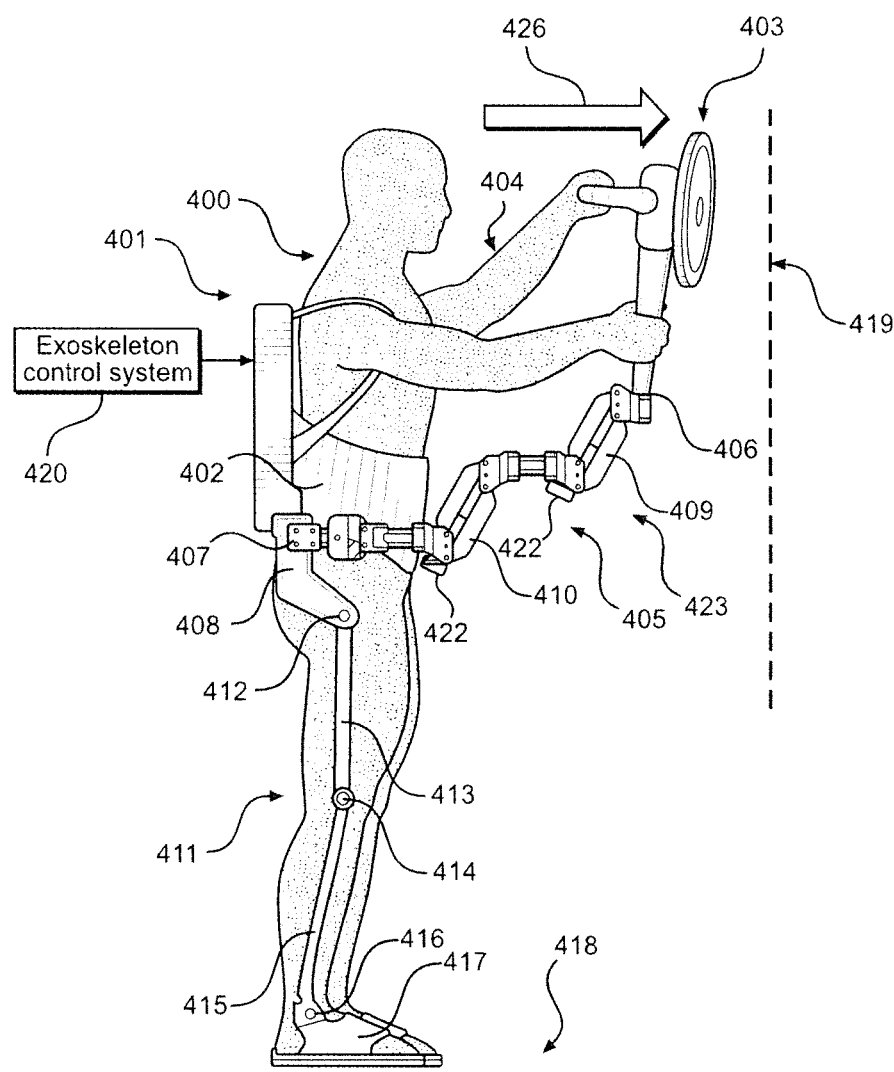
FIG. 4A is a side view of a worker wearing an exoskeleton constructed in accordance with a second embodiment of the present invention, the exoskeleton being equipped with a hip-mounted, non-anthropomorphic, gravity-compensating tool-holding arm device and tool, with the position of the arm being selectively fixable. The tool-holding arm is shown in the free (i.e., non-fixed) position, allowing the worker to apply force into the tool and work surface through his or her arms.

A second embodiment of the present invention, in which the tool-supporting arm can be selectively locked into a fixed position by the exoskeleton wearer, is shown in FIGS. 4A-E. In FIG. 4A, a person 400 is wearing a tool-holding exoskeleton 401 that is equipped with a gravity-compensating tool-holding arm 405, with exoskeleton 401 being attached to exoskeleton wearer 400 by strapping 402. A hip structure 408 of exoskeleton 401 is connected to tool-holding arm 405 at a hip coupling 407, with tool-holding arm 405 connecting to and supporting the weight of a floating tool 403 at a tool coupling 406. Tool-holding arm 405 is composed of an upper tool arm link 409 and a lower tool arm link 410, with the tool arm links of tool-holding arm 405 being flexibly connected such that they are movable relative to each link so as to allow exoskeleton wearer 400 to use arms 404 to change the position of floating tool 403 relative to exoskeleton 401 and exoskeleton wearer 400. Tool arm lock motors 422 of tool-holding arm 405 are in the unlocked state in this figure. The weight of tool 403 is transferred through tool coupling 406 to upper tool arm link 409, then to lower tool arm link 410, then to hip coupling 407 and into hip structure 408 of exoskeleton 401. Hip structure 408 is rotatably connected to a thigh link 413 at a hip 412, with thigh link 413 being rotatably connected to a shank link 415 at a knee 414, with shank link 415 being rotatably connected to a foot structure 417 at an ankle 416. This connectivity allows the weight of exoskeleton 401, tool 403 and tool-holding arm 405 to be transferred around legs 411 of exoskeleton wearer 400, through hip structure 408, through thigh link 413 and shank link 415, into foot structure 417 and ultimately to a support surface 418. Exoskeleton wearer 400 can also walk while wearing exoskeleton 401, with exoskeleton 401 continuing to support the weight of tool 403 and tool-holding arm 405. Since tool-holding arm 405 is in an unlocked tool arm state 423 in FIG. 4A, if exoskeleton wearer 400 wishes to push floating tool 403 into a work surface 419, a force 426 must be transferred to floating tool 403 through arms 404 of exoskeleton wearer 400.

Figure 4B:
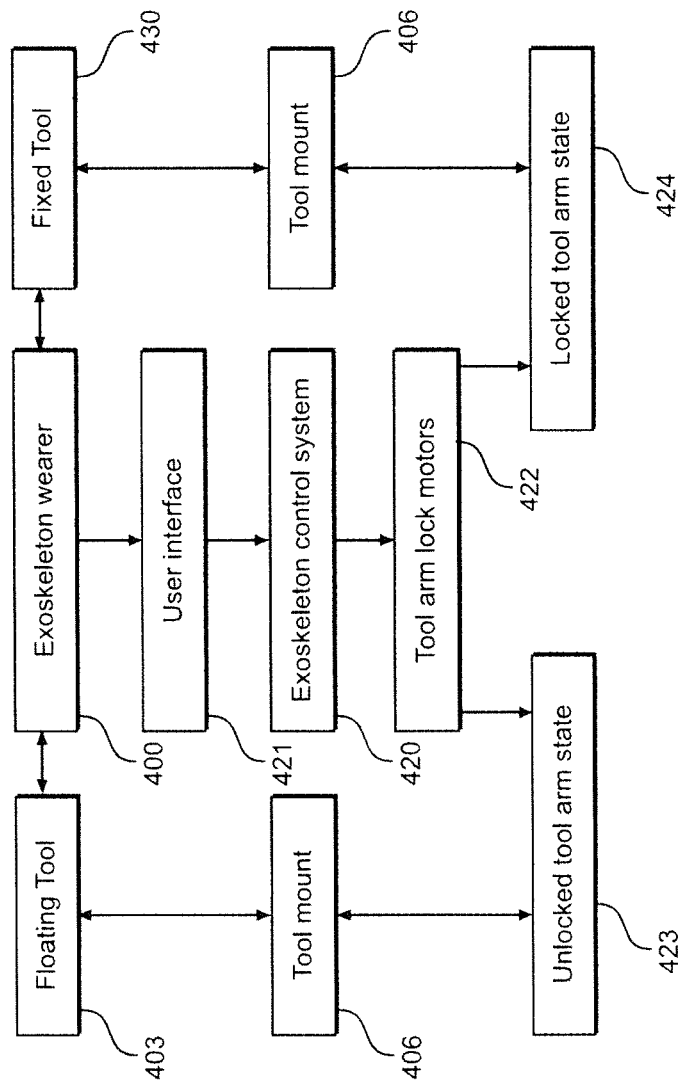
FIG. 4B is a box diagram of the systems in communication in the second embodiment in which the position of the tool-supporting arm is fixed or released by the exoskeleton control system, as selected by the exoskeleton wearer.

FIG. 4B illustrates that, by means of the device and method of the second embodiment, exoskeleton wearer 400 can use a user interface 421 to direct an exoskeleton control system 420 to activate tool arm lock motors 422, changing the state of tool arm 405 from unlocked tool arm state 423 to a locked tool arm state 424, and changing the state of the tool from floating tool 403 to a fixed tool 430.

Figure 4C:
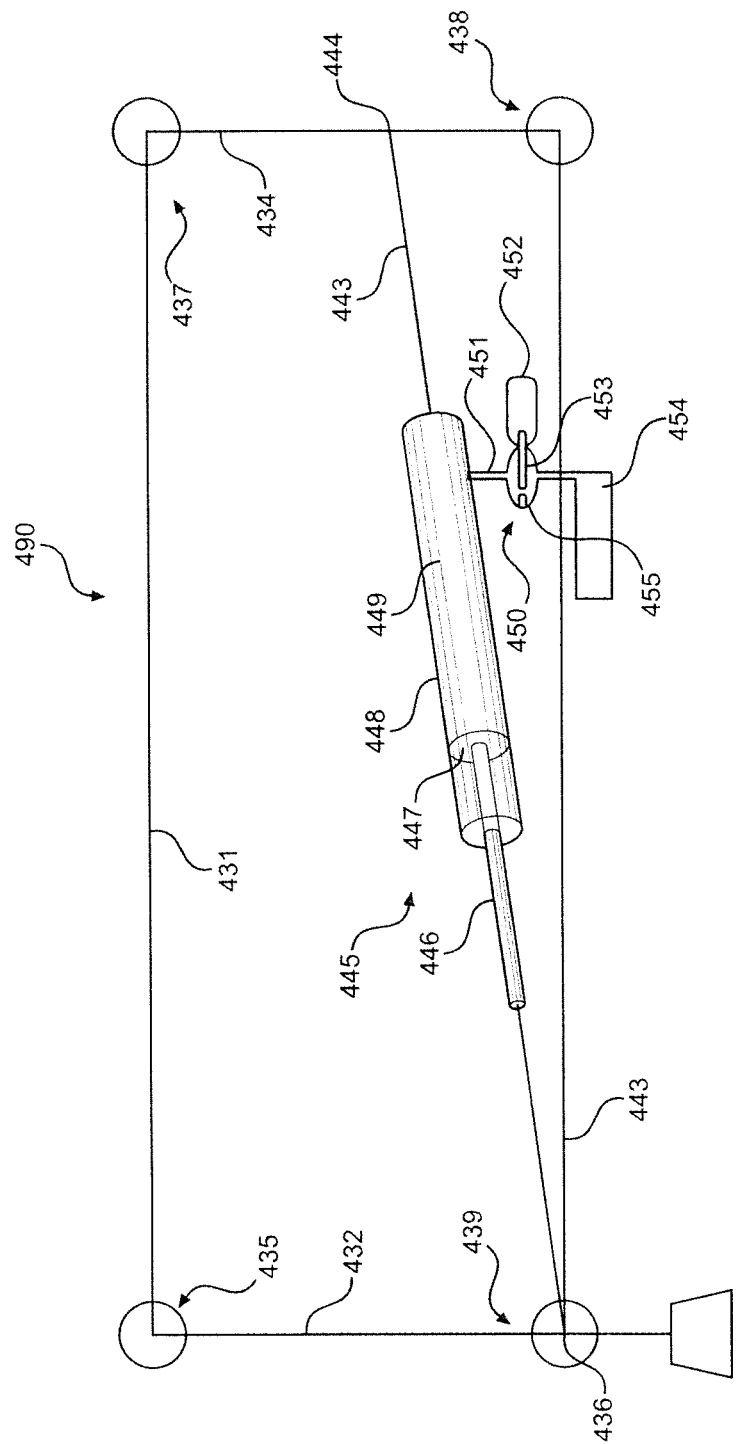
FIG. 4C is a simplified diagram of the device of the second embodiment within a parallelogram support linkage of a gravity-compensating tool-holding arm.

FIG. 4C is a simplified diagram showing how the position of a tool arm lifting parallelogram 490 can be locked in accordance with the second embodiment. Rigid sides 431-434 pivot at corner points 435-438 in such a way that the connectivity of rigid sides 431-434 is not changed. A tangential member 443 spans from corner 436 to intersect 444 of rigid side 434, with tangential member 443 being changeable in length by action of a gas spring 445. Gas spring 445 is comprised of a rod 446, a plunger 447, a cylinder 448 and a gas 449, with the flow of gas 449 into and out of gas spring 445 being controlled by a damping valve 450. Damping valve 450 is comprised of a tube 451, a motor 452, a stem 453, a seat 455, and an inlet/outlet 454. When damping valve 450 is in an open position, gas 449 can pass freely into and out of cylinder 448, allowing the position of plunger 447 to rapidly change and the length of tangential member 443 to change as needed by a change in the shape of lifting parallelogram 490, allowing the tool-holding arm to move freely. Alternatively, when motor 452 is engaged causing stem 453 to contact seat 455, gas 449 flow into and out of cylinder 448 is prevented, limiting the length change in tangential member 443 and restricting or preventing the change in shape of lifting parallelogram 490, with intermediate valve positions resulting in intermediate resistance to the change of the shape of lifting parallelogram 490.

Figure 4D:
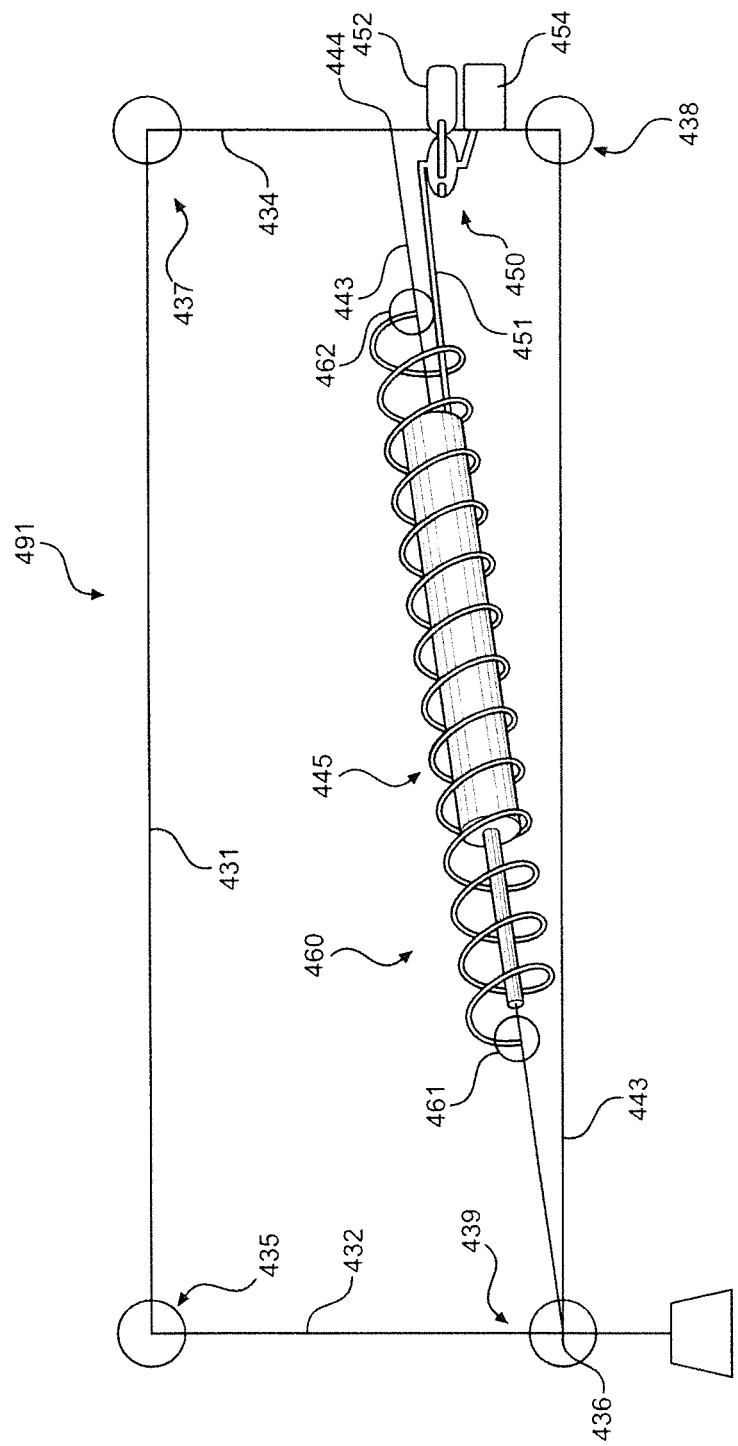
FIG. 4D is a simplified diagram of the device of the second embodiment within a parallelogram similar to a support linkage of a gravity-compensating tool-holding arm.

FIG. 4D shows a preferred variation of the second embodiment in which a lifting parallelogram 491 has a tensioning spring 460 affixed along tangential member 443 at spring attachment points 461 and 462. Gas spring 445 is located within the coil of tensioning spring 460 and between spring attachment points 461 and 462 along the length of tangential member 443. Additionally, tube 451 and damping valve 450 are configured so as to be out of contact with tensioning spring 460 over a range of positions of lifting parallelogram 491.

Figure 4E:
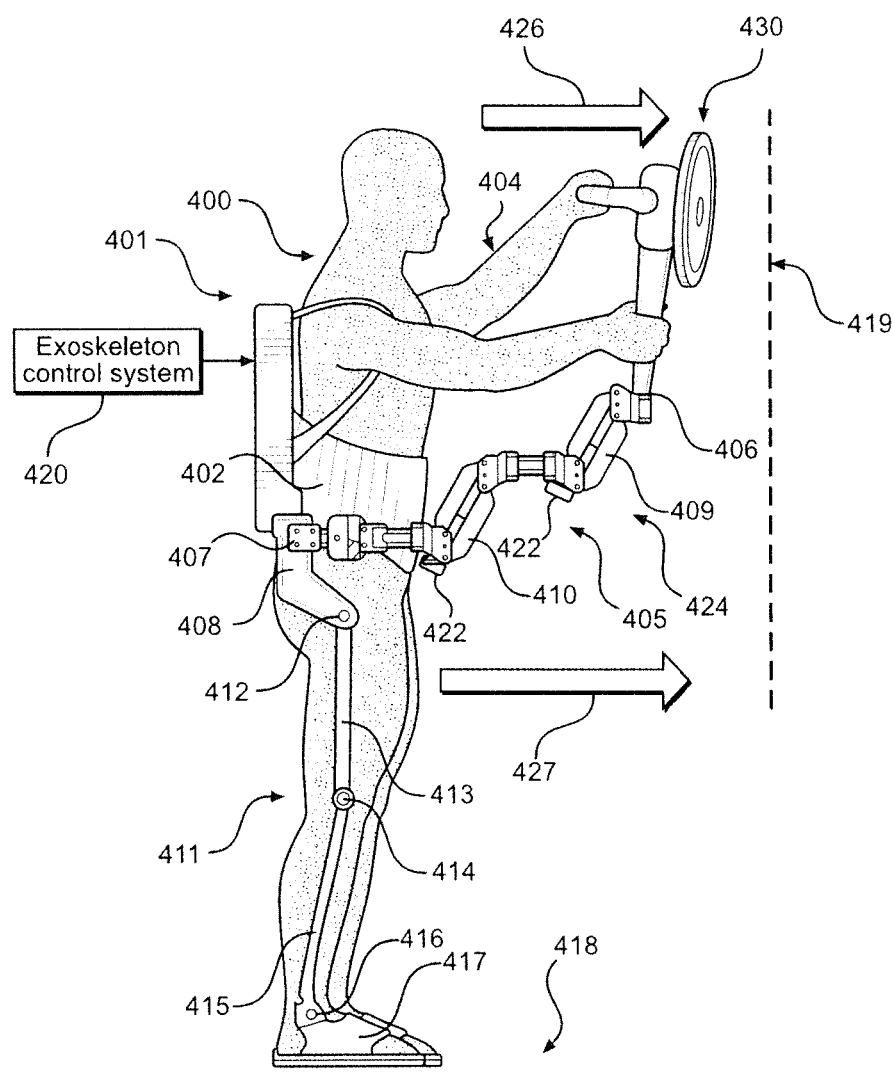
FIG. 4E is a side view of the worker and exoskeleton of FIG. 4A. The tool-holding arm is shown in the fixed position, allowing the worker to apply force into the tool and work surface through his or her arms through the tool-holding arm.

FIG. 4E shows exoskeleton 401 with tool-holding arm 405 in a locked tool arm state, with fixed tool 430 in a locked position relative to person 400. This allows person 400 to lean into tool-holding arm 405, causing a force 427 to be transferred through tool-holding arm 405 into fixed tool 430 and to work surface 419 in addition to force 426 upon tool 430 transferred through arms 404 of person 400. In some embodiments, the lockable spring member is parallel to the tensioning spring. In some embodiments, the locking spring contains hydraulic fluid rather than air. In some embodiments, the valve is manually powered rather than controlled and powered by the exoskeleton control system. In some embodiments, the inlet/outlet is a simple vent. In some embodiments, the inlet/outlet includes a fluid or gas reservoir. In some embodiments, the position of the lifting parallelogram is lockable through mechanical means other than a gas spring.

As an example of the second embodiment, consider a worker at a manufacturing facility finishing welds with a grinder. Through use of the device of the second embodiment, the worker can lean into the tool-supporting arm, transferring the weight of his or her body and the exoskeleton into the grinder and work surface, resulting in a greater application of force with less effort than would be achievable with only the force being transferred through his or her arms.

A third embodiment of the present invention, a mechanism by which the spring tension and/or rigidity in each lifting parallelogram of a gravity-compensating arm can be remotely adjusted, is shown in FIGS. 5A-E. With initial reference to FIGS. 5A and 5B, an exoskeleton wearer 500 is wearing an exoskeleton 501. A hip structure 508 of exoskeleton 501 is connected to tool-holding arm 505 at a hip coupling 507, with tool-holding arm 505 connecting to and supporting the weight of a tool 503 at a tool coupling 506. Tool-holding arm 505 is composed of an upper tool arm link 509 and a lower tool arm link 510, with the tool arm links of tool-holding arm 505 being flexibly connected such that they are movable relative to each link so as to allow exoskeleton wearer 500 to use arms 504 to change the position of tool 503 relative to exoskeleton 501 and exoskeleton wearer 500. The spring tension of each link of tool arm 505 is controlled by a remote pressure device 520, with remote pressure device 520 being mounted on the rear structure of exoskeleton 501. A pressure conduit 521 transfers a pressurized fluid 530 through pressure conduit 521 to hydraulic pistons 533 and 543, with hydraulic pistons 533 and 543 lying on tangential members 534 and 544 of lower tool arm link 510 and upper tool arm link 509, respectively. A motor 525 of remote spring pressure device 520 controls the position of a rod 526 and a plunger 527 in a cylinder 528, resulting in changes in a pressure 529. Since a fluid reservoir 530 is linked by pressure conduit 521 to a fluid 532 in hydraulic piston 533 and a fluid 542 in hydraulic piston 543, allowing free movement of fluid, effectively, both hydraulic piston 533 and hydraulic piston 543 experience an identical spring force relative to pressure 529 in remote pressure device 520. In this way, the spring tension of tool arm 505 can be adjusted for optimal gravity compensation for a range of tools without need for manual adjustments to spring position on the tool arm and without need for bulky or heavy motors being mounted on the tool arm itself. In some embodiments, the phases at 531 are separated by a physical device such as a floating plunger. In some embodiments, the remote spring device is not pressurized by a motor but rather has its pressure changed by a regulator fed from a compressor or compressed air tank. In some embodiments, the remote pressure device is controlled by the exoskeleton control system.

Figure 5A:
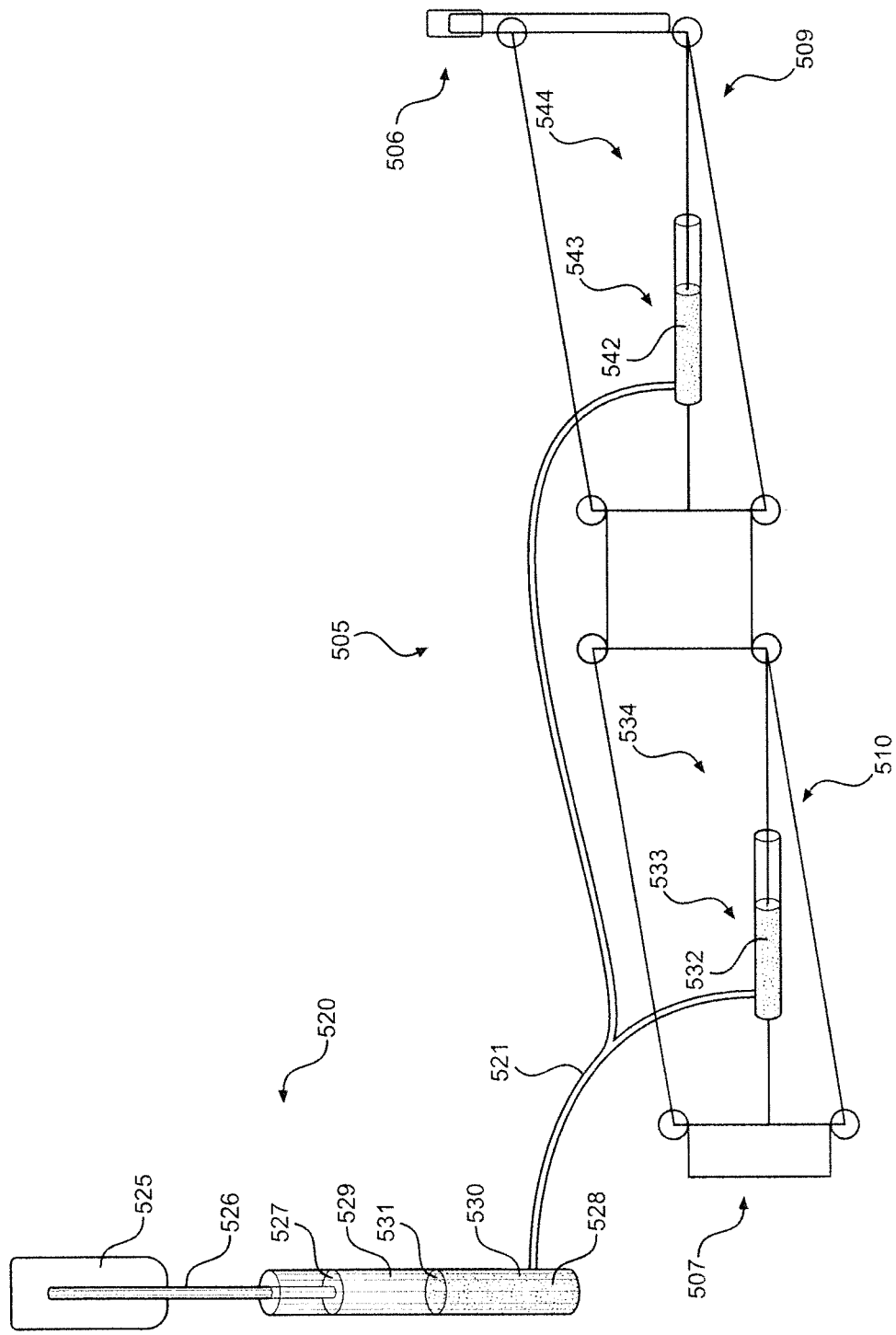
FIG. 5A is a simplified diagram of a device constructed in accordance with a third embodiment of the present invention.
Figure 5B:
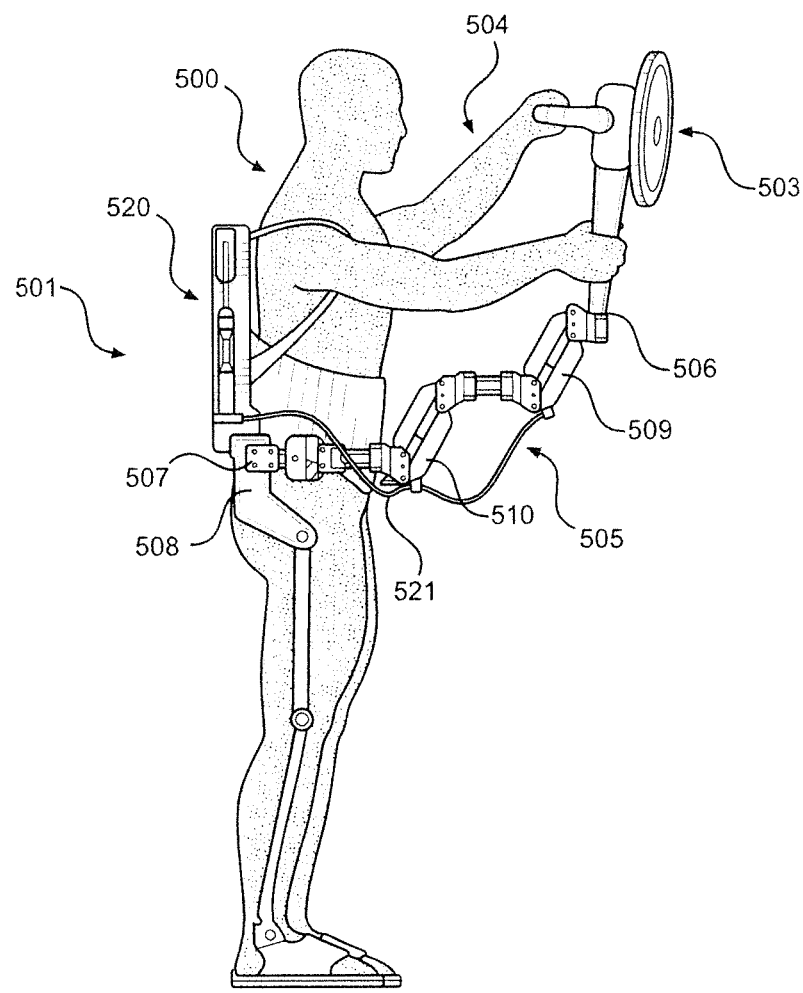
FIG. 5B is a side view of a worker wearing an exoskeleton constructed in accordance with the third embodiment.
Figure 5C:
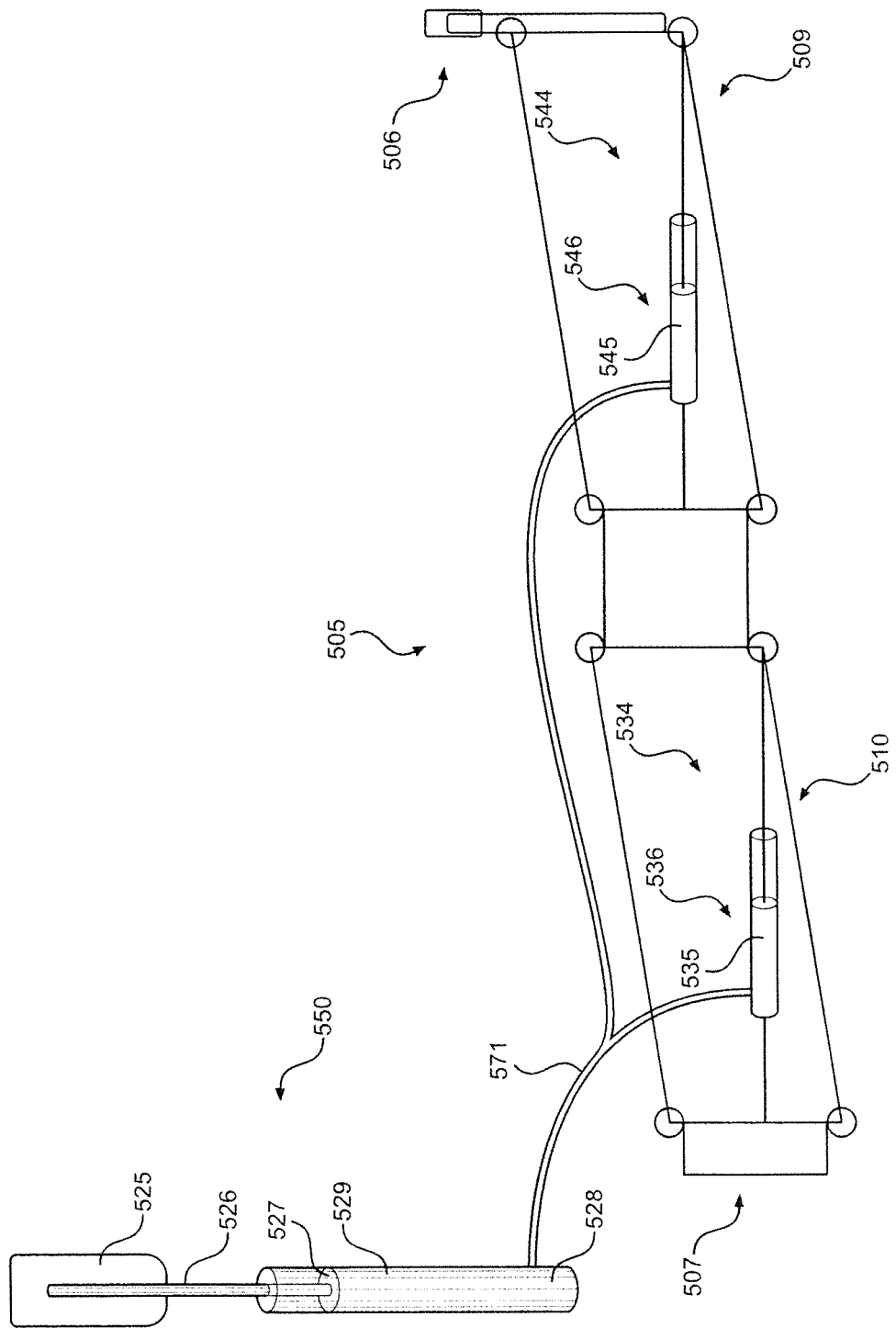
FIG. 5C is a simplified diagram of a variation of the device of the third embodiment.

FIG. 5C shows a variant of the third embodiment where there is no fluid in the system and a pressurized gas line 571 links a remote pressure device 550 with gas springs 536 and 546. Pressure 529 is equal to a pressure 535 and a pressure 545, allowing remote pressure device 550 to control the spring tension in both gas spring 536 and gas spring 546.

Figure 5D:
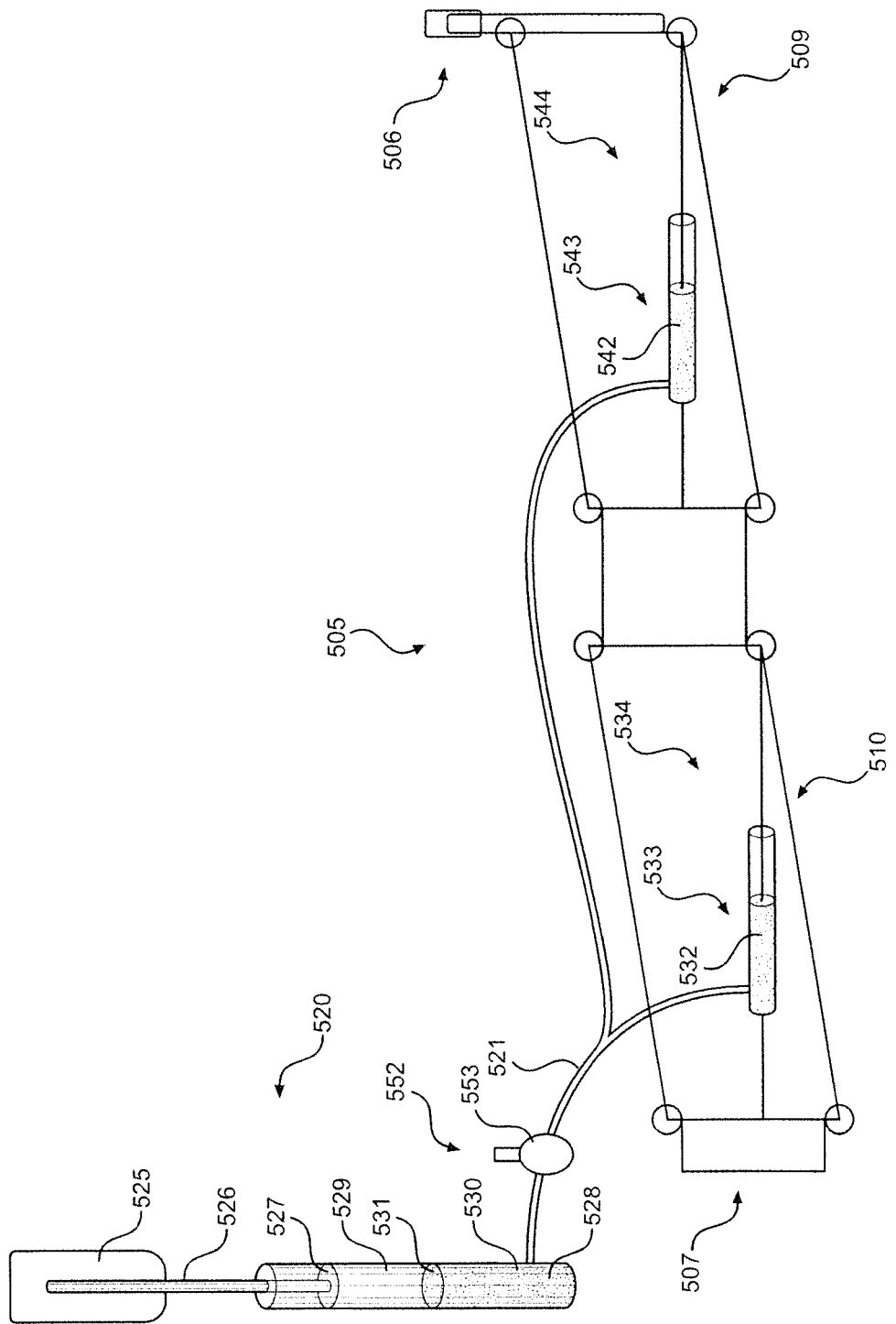
FIG. 5D is a simplified diagram of another variation of the device of the third embodiment, with the device allowing for the position of a tool-holding arm to be selectively fixable, and with the tool-holding arm shown in the free (i.e., non-fixed) state.
Figure 5E:
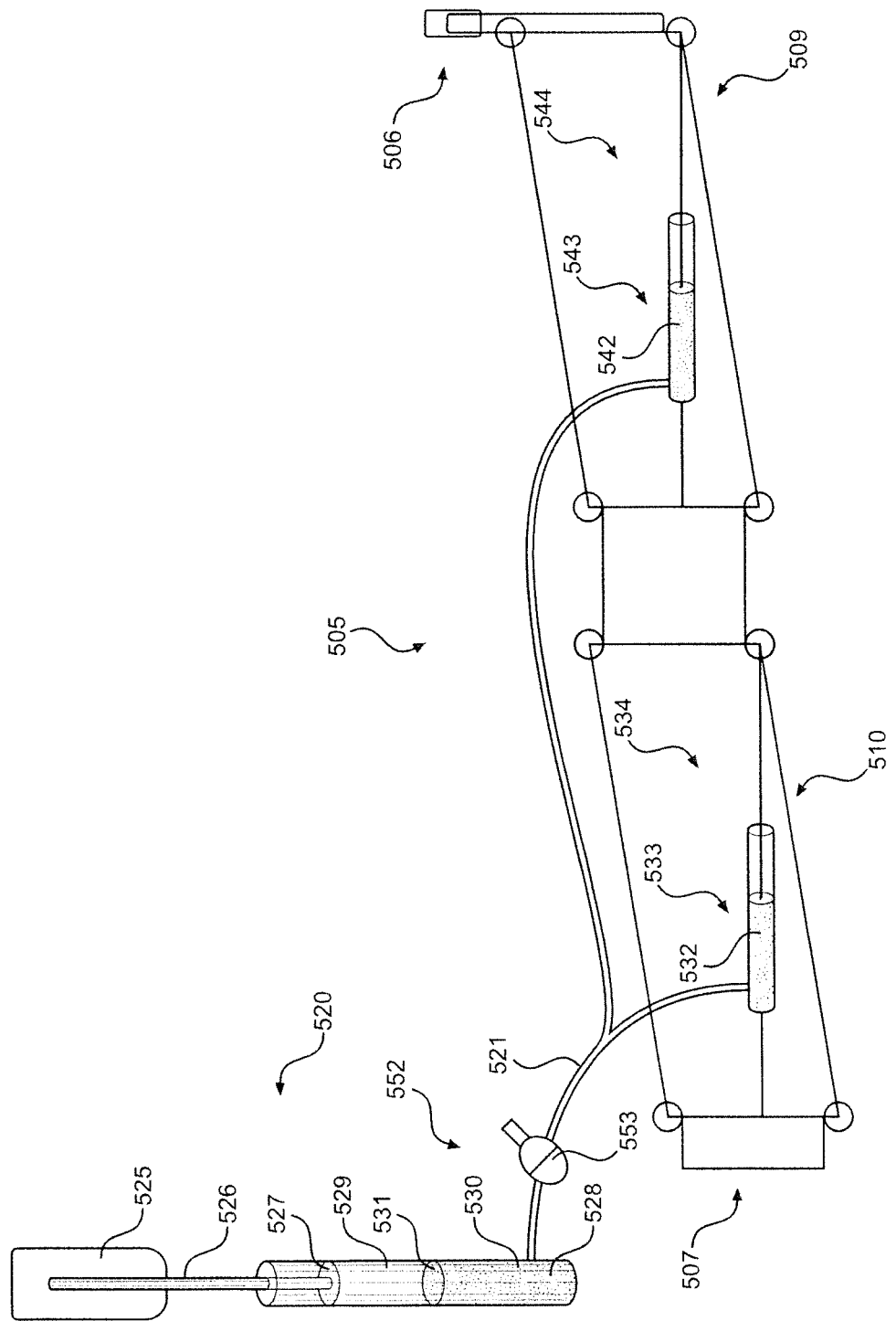
FIG. 5E is a simplified diagram of the variation of FIG. 5D, with the tool-holding arm shown in the fixed state.

FIGS. 5D and 5E show a further variant of the third embodiment in which the position of a ball valve 553 of an actuated valve 552 selectively restricts or allows the flow of fluid (or, in some embodiments, gas) through pressure conduit 521, allowing the position of tool supporting arm 505 to be selectively locked into a fixed position. In some embodiments, the position of this valve is controlled by the exoskeleton control system. In some embodiments, this valve is manually controlled by the exoskeleton wearer. In all embodiments, the placement of motors and valves can be away from or opposite the tool-supporting arm, improving the balance of the exoskeleton. In some embodiments, a lifting force in excess of what is needed for gravity compensation is provided.

As an example of the third embodiment, consider a construction worker wearing a tool-holding exoskeleton. Over the course of a shift, this worker needs to alternate between use of a spot welder, a rivet setting tool and a concrete saw. Through use of the device of the third embodiment, the worker can rapidly switch between these tools, allowing a single tool-holding arm to support each tool in the execution of labor as needed without requiring time consuming manual adjustments of spring tension. This embodiment has the advantage of reduced weight being on the tool arm since the adjustment motor is not located on the tool arm, allowing for greater tool weight to be supported, reducing hip torque and improving exoskeleton balance. Further, through use of the variant equipped with a valve, the worker can fix the position of the tool arm while working, allowing the worker to lean into the tool during activities such as riveting.

A fourth embodiment of the present invention is shown in FIGS. 6A-D. With initial reference to FIGS. 6A-C, a person 600 is shown wearing an exoskeleton 671 while using a tool 603 with arms 604. Exoskeleton 671 is attached to person 600 by strapping 602. A tool supporting arm 605 of exoskeleton 671 supports tool 603, with tool supporting arm 605 attached at a fixed angle to a hip spur 672 at a hip mount 678. Hip spur 672 is attached to the structure of exoskeleton 671 and rotatably connected to a thigh link 673 at a hip 670. Thigh link 673 is rotatably connected to a shank link 675 at a knee 674, with shank link 675 having a knee spur 679. Shank link 675 is rotatably connected to a foot structure 677 at an ankle 676, with foot structure 677 having an ankle spur 680. Foot structure 677 is in contact with a support surface 618. A weight 626 of tool 603 and tool supporting arm 605 is transferred around legs 611 of person 600 as a compressive support 627, through thigh link 673, to shank link 675, to foot structure 677 and into surface 618. Hip spur 672 is connected to knee spur 679 by an upper tensile member 681, and knee spur 679 is connected to ankle spur 680 by a lower tensile member 682. A distance 683 from the connection point of upper tensile member 681 to hip 670 is equal to a distance 684 from the connection point of upper tensile member 681 to knee 674. Distance 684 from the connection point of lower tensile member 682 to knee 674 is equal to a distance 685 from the connection point of lower tensile member 682 to ankle 676. This connectivity results in upper tensile member 681 being parallel to thigh link 673 and lower tensile member 682 being parallel to shank link 675 even when the angle of knee 674 is changed. Due to this connectivity and fixed-distance structure, the angle of hip spur 672 relative to hip 670 is linked to the angle of ankle spur 680 relative to ankle 676, with this resulting in hip spur 672 being parallel to ankle spur 680, such that, when foot structure 677 is standing on a flat surface 618, tool supporting arm 605, which is connected to hip spur 672, is kept in parallel (relative to hip 670) position, counteracting a hip torque 628 resulting from weight 626 of tool 603 over a distance 621 and tool supporting arm 605. Hip torque 628 is transferred as a force 629 at hip spur 672, and as forces 630 and 636 through tensile members 681 and 682, respectively, to ankle spur 680, resulting in an ankle torque 637 at ankle 676, with the rotation at ankle 676 being prevented by surface 618. While the transfer of hip torque to the ankle is favorable to a worker who is engaged in tool use in a stationary position, high ankle torque makes walking awkward.

Figure 6A:
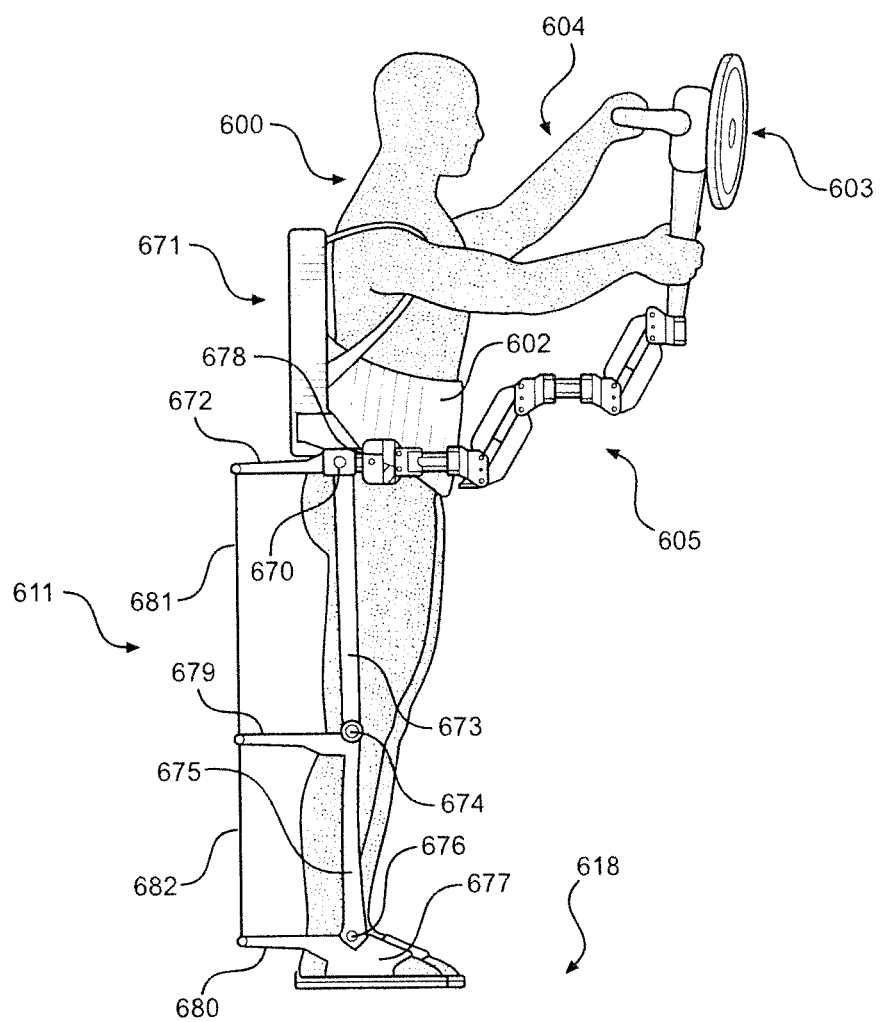
FIG. 6A is a side view of a worker wearing an exoskeleton constructed in accordance with a fourth embodiment of the present invention, the exoskeleton being equipped with a hip-mounted, non-anthropomorphic tool-holding arm device and tool. The exoskeleton is additionally equipped with rigid and tensile links behind the legs of the exoskeleton to counteract hip torque resulting from the weight of the tool-holding arm, with these tensile links being parallel to the leg links of the exoskeleton.
Figure 6B:
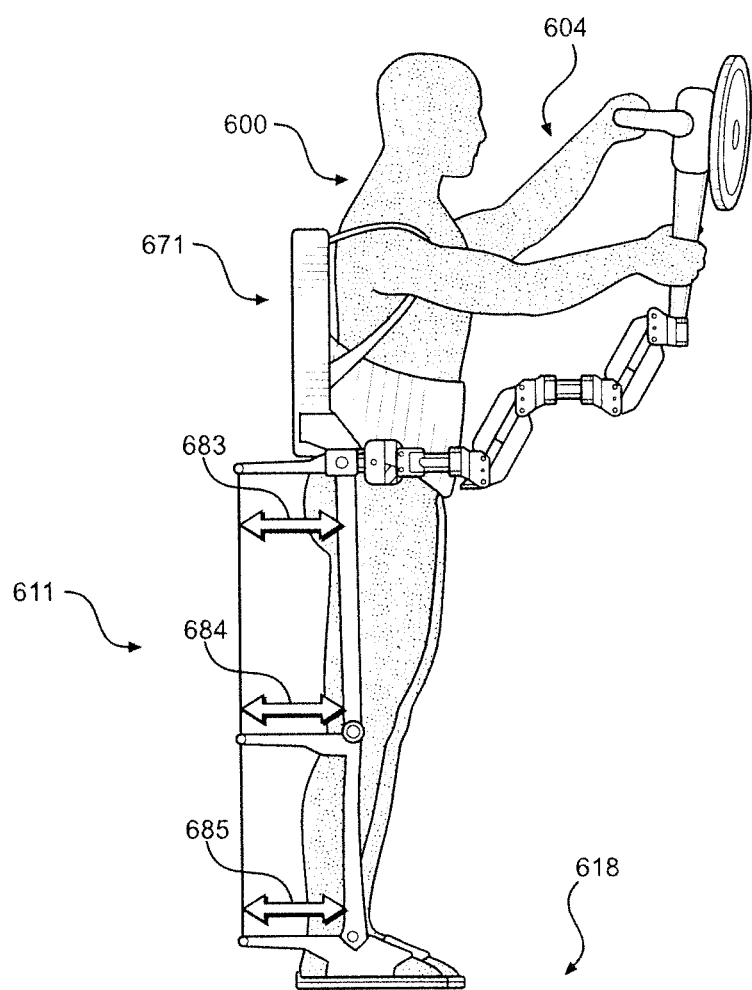
FIG. 6B is a side view of the worker and exoskeleton of FIG. 6A showing the equal distance between the leg support links of the exoskeleton and the tensile links behind the legs of the exoskeleton.
Figure 6C:
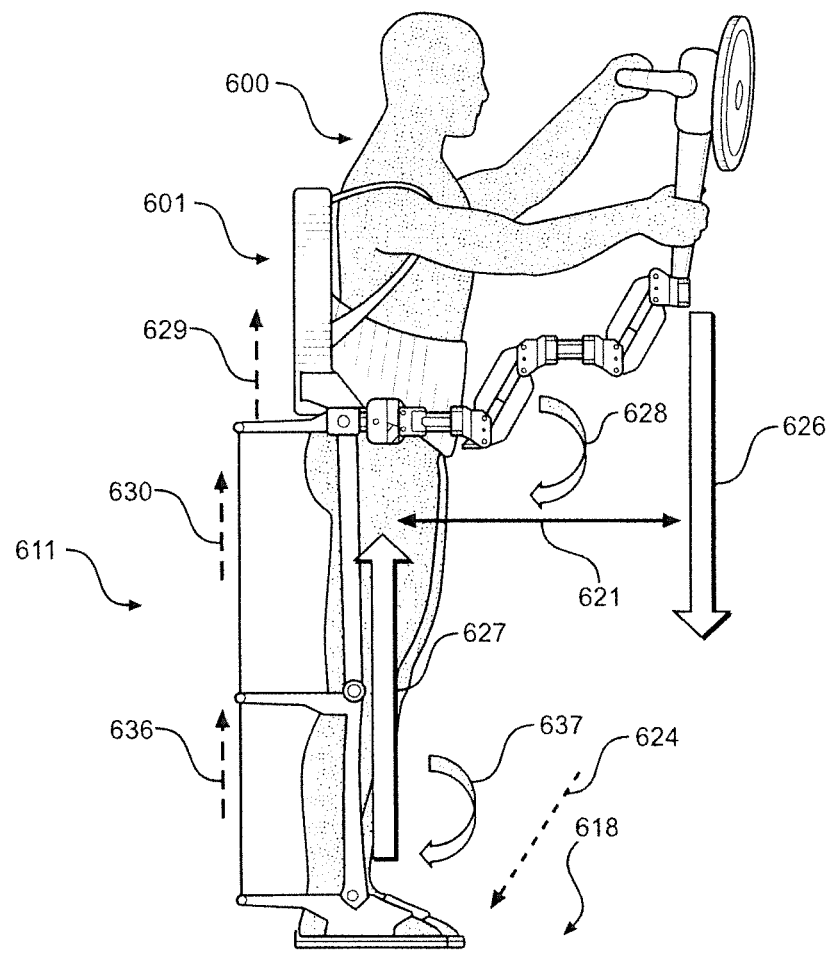
FIG. 6C is a side view of the worker and exoskeleton of FIG. 6A showing the forces experienced by various links and structures in the exoskeleton.
Figure 6D:
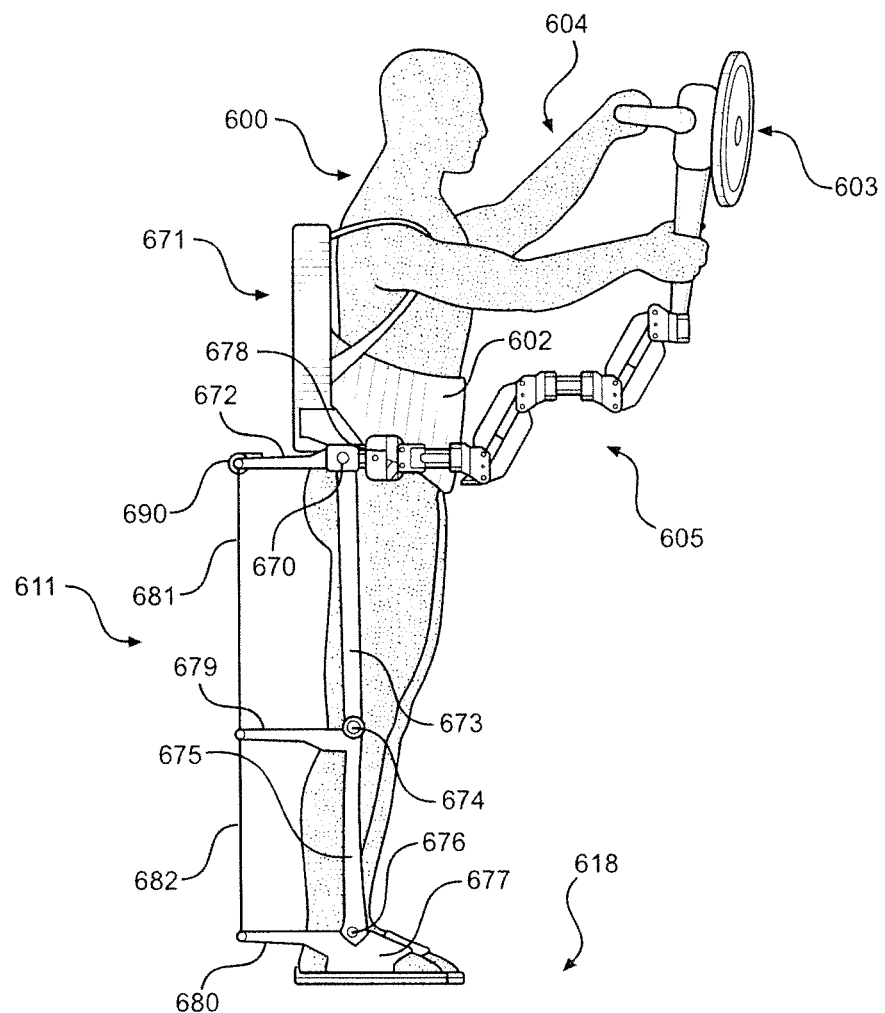
FIG. 6D is a side view of a worker wearing an exoskeleton constructed in accordance with the fourth embodiment, with the length of the tensile links and their tension being adjustable by a winch.

In FIG. 6D, a winch 690 is mounted on hip spur 672, with winch 690 selectively affecting the length and tension on tensile member 681 (and tensile member 682, which can be connected, or tensile members 681 and 682 can be a single tensile member). A release of tensile member tension (lengthening) effects a reduction/removal of ankle torque, allowing the exoskeleton and wearer to walk to a new position, at which point the winch can re-tighten (shorten) the length of the tensile member, reduce hip torque and potentiate tool use. In some embodiments, the motor controlling the length of the tensile member is located in a different position, including positions requiring additional lengths and routing of the tensile member(s), such as a hip mount. In some embodiments, a screw drive is used to change the length of the tensile member. In some embodiments, the tensile member is replaced by a rigid member. In some embodiments, a manual crank, cam or other non-powered device can be used to affect the length/tension of the tensile member.

As an example of the fourth embodiment, consider a worker in a dry-dock using an exoskeleton-mounted grinder to clean the hull of a ship. If this worker needs to climb scaffolding or stairs to work in a restricted environment, any additional awkwardness walking in the exoskeleton would be undesirable. Through use of the device of the fourth embodiment, the worker can walk less awkwardly with the exoskeleton but still use the exoskeleton to support the grinder and prevent hip torque during tool use, decreasing worker fatigue and improving worker output.

Figure 7A:
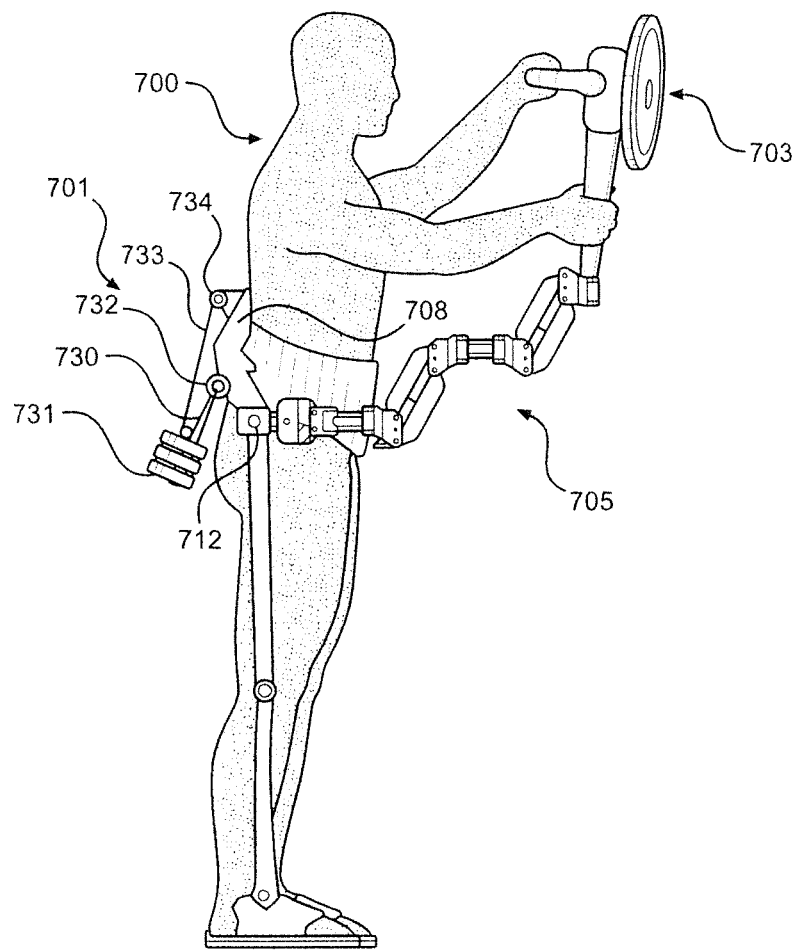
FIG. 7A is a side view of a worker wearing an exoskeleton constructed in accordance with a fifth embodiment of the present invention, the exoskeleton being equipped with a hip-mounted, non-anthropomorphic tool-holding arm device and tool. The exoskeleton is additionally equipped with an adjustable counterbalance in the rear of the exoskeleton, with the counterbalance being shown in the retracted position.
Figure 7B:
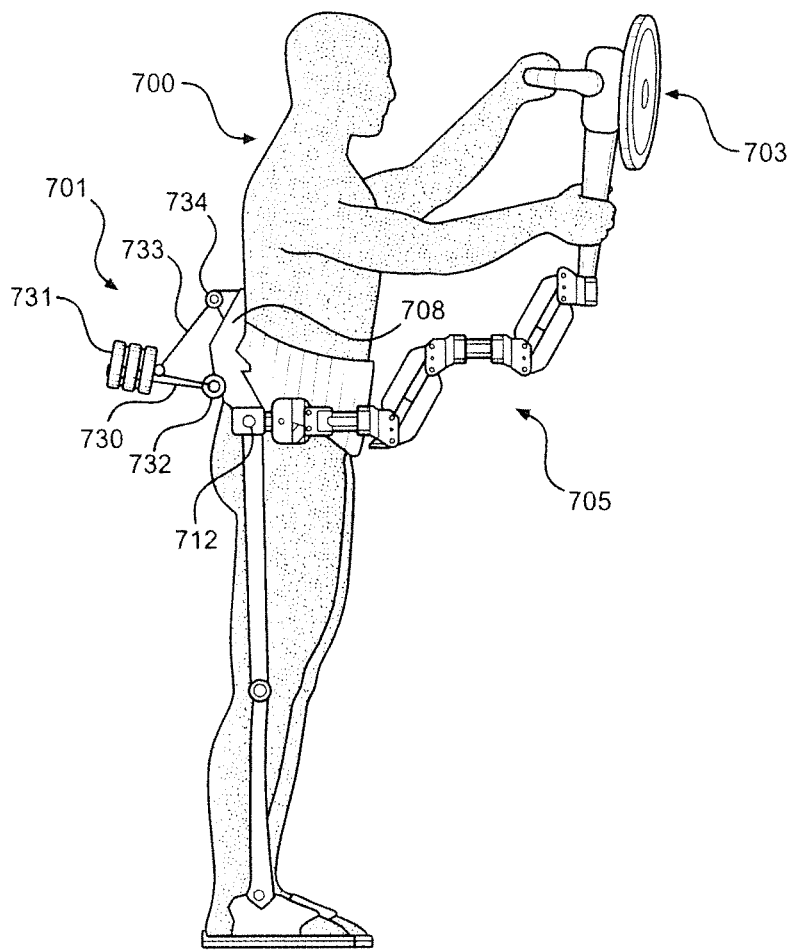
FIG. 7B is a side view of the worker and exoskeleton of FIG. 7A, with the counterbalance being shown in the extended position.

A fifth embodiment of the present invention, in which an adjustable counterbalance at the rear of a tool-holding exoskeleton assists in exoskeleton balance and hip torque issues relating to the tool-holding arm, is shown in FIGS. 7A and 7B. A person 700 is wearing an exoskeleton 701 equipped with a tool-holding arm 705 and a tool 703. Tool-holding arm 705 is mounted at a hip 712, with a hip structure 708 also connected at hip 712. A counterweight arm 730 is rotatably connected to hip structure 708 at a pivot 732, with the position of counterweight arm 730 being controlled by the length of a tensile member 733. The length of tensile member 733 is controlled by a winch 734, with winch 734 being mounted on hip structure 708. The distance of a weight 731 to hip 712 causes a counterclockwise hip torque at hip 712 to counteract the clockwise hip torque at hip 712 caused by the weight of tool-holding arm 705 and tool 703. FIG. 7B shows the counterbalance arm in the up position, which provides greater counterbalance to the tool-holding arm and tool. FIG. 7A shows the counterbalance arm in the down position, which provides less balance but is less bulky. In some embodiments, the length of the tool-holding arm is substantially greater, allowing for better counterbalancing when extended but increased bulk and awkward maneuverability in tight spaces. In some embodiments, the length of the counterbalance arm is changeable by telescoping or another similar mechanism, allowing further adjustment to the counterbalance options. In some embodiments, the counterbalance arm is actuated by means other than a winch. In some embodiments, the counterbalance arm can be actuated in the axial plane to balance a tool-holding arm extended outside of the central sagittal plane. In some embodiments, the winch or other counterbalance actuation is in communication with and controlled by the exoskeleton control system. In some embodiments, the position of the counterbalance arm is manually controlled and/or manipulated by the exoskeleton wearer. In some embodiments, the counterbalance arm contains n-links that can be positioned independently, not unlike the function of a biological tail.

As an example of the fifth embodiment, consider a construction worker in an environment with both open and tight workspaces. Through use of the device of the fifth embodiment, this worker can maximize balance and minimize hip torque in open areas but rapidly adjust the exoskeleton to a more compact state for work activities in tighter workspaces.

Figure 8:
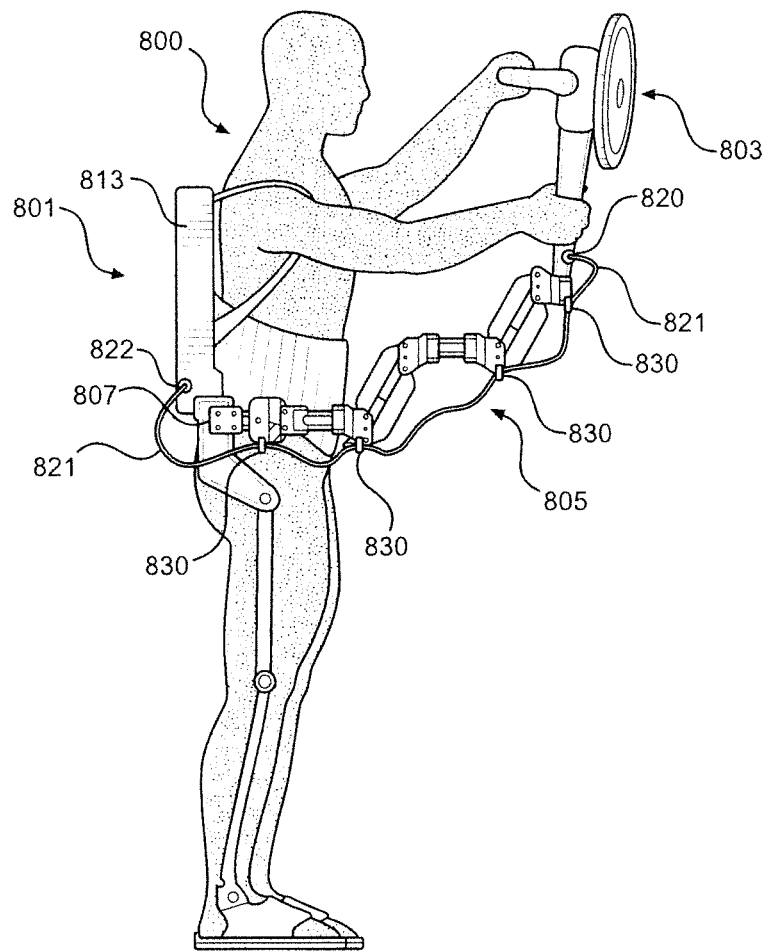
FIG. 8 is a side view of a worker wearing an exoskeleton constructed in accordance with a sixth embodiment of the present invention, the exoskeleton being equipped with a hip-mounted, non-anthropomorphic tool-holding arm device and tool. The tool draws power from an energy source mounted on the structure of the exoskeleton distal to the tool.

A sixth embodiment of the present invention, in which an exoskeleton supplies power and consumables to a tool mounted on a tool-holding arm, is shown in FIG. 8. A worker 800 is wearing an exoskeleton 801, with a tool 803 being mounted on a tool-supporting arm 805. Tool-supporting arm 805 is attached to the structure of exoskeleton 801 at a hip coupling 807. Tool 803 receives power from an energy storage device 813, with energy storage device 813 being mounted on the rear of exoskeleton 801 away from tool 803. Tool 803 draws power through a conduit 821, with conduit 821 connecting to tool 803 at a conduit-tool coupling 820 and to energy storage device 813 at a conduit-energy storage device coupling 822. Conduit 821 is routed along tool-holding arm 805 at conduit guides 830. In some embodiments, the energy storage device is a battery, a compressed air cylinder, a fuel cell or another energy storage device known in the art. In some embodiments, the energy storage device is replaced or augmented with an internal combustion engine coupled to an electrical generator, compressed air cylinder or hydraulic pump. In some embodiments, the energy storage device acts as a power routing/adaptor system, allowing continuous or intermittent interface between the exoskeleton and an external power supply. In some embodiments, the conduit is an electrical cord, compressed air hose, hydraulic line, mechanical transfer line or another energy transfer device known in the art. In some embodiments, the exoskeleton is passive, and only the tool and related systems receive or require power. In other embodiments, the exoskeleton is powered, and power is shared between the powered exoskeleton systems (such as joint actuators) and the mounted tool. In some embodiments, the exoskeleton control system is in communication with the tool, allowing adjustments to be made to some tool settings, such as spot welding guns, and allowing the tool to report faults or other alerts to the exoskeleton control system, with the exoskeleton wearer being able to access these data and functions through an exoskeleton user interface. In some embodiments, the power source for the tool acts as an exoskeleton counterbalance, offsetting hip torque resulting from the tool arm and tool weight and balancing the exoskeleton.

As an example of the sixth embodiment, consider a worker wearing an industrial exoskeleton in a demolitions environment where long power cords are impractical and surfaces are uneven. Through use of the device of the sixth embodiment, the balance of the exoskeleton is improved through weight redistribution and balancing, and the power cords are routed in such a way as to reduce the likelihood of the worker becoming entangled in cords. Preventing cord tangle has the benefit of improving exoskeleton maneuverability in certain enclosed environments or in environments where cords may become ensnared on rubble or machinery.

Figure 9A:
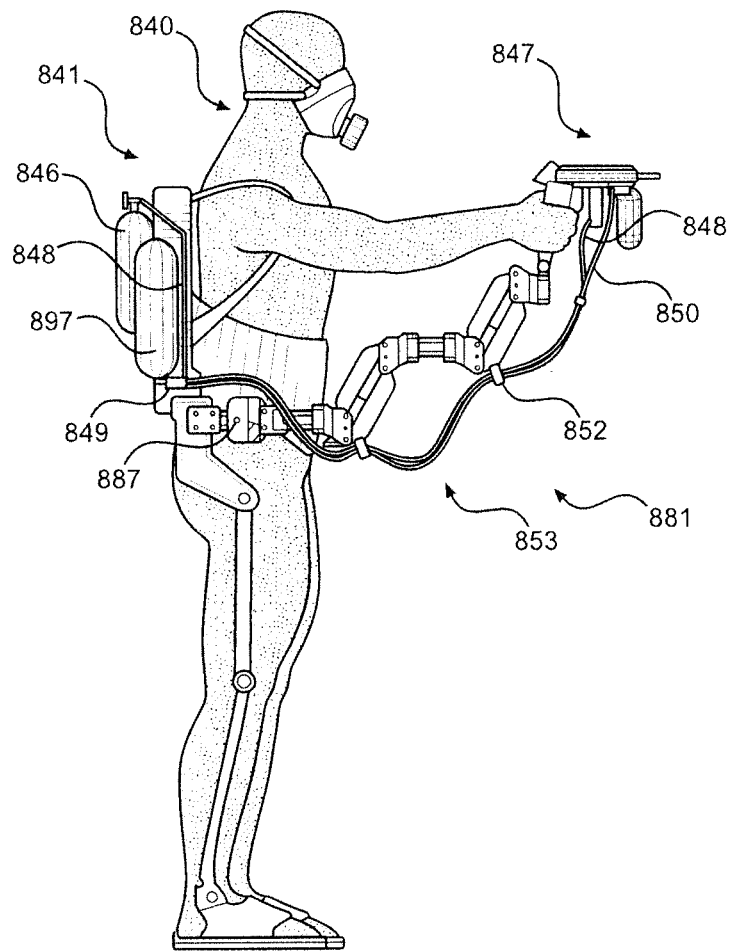
FIG. 9A is a side view of a worker wearing an exoskeleton constructed in accordance with a seventh embodiment of the present invention, the exoskeleton being equipped with a hip-mounted, non-anthropomorphic tool-holding arm device and tool. The tool draws power from an energy source mounted on the structure of the exoskeleton distal to the tool, and liquid consumables are fed to the tool from a storage tank mounted on the structure of the exoskeleton.
Figure 9B:
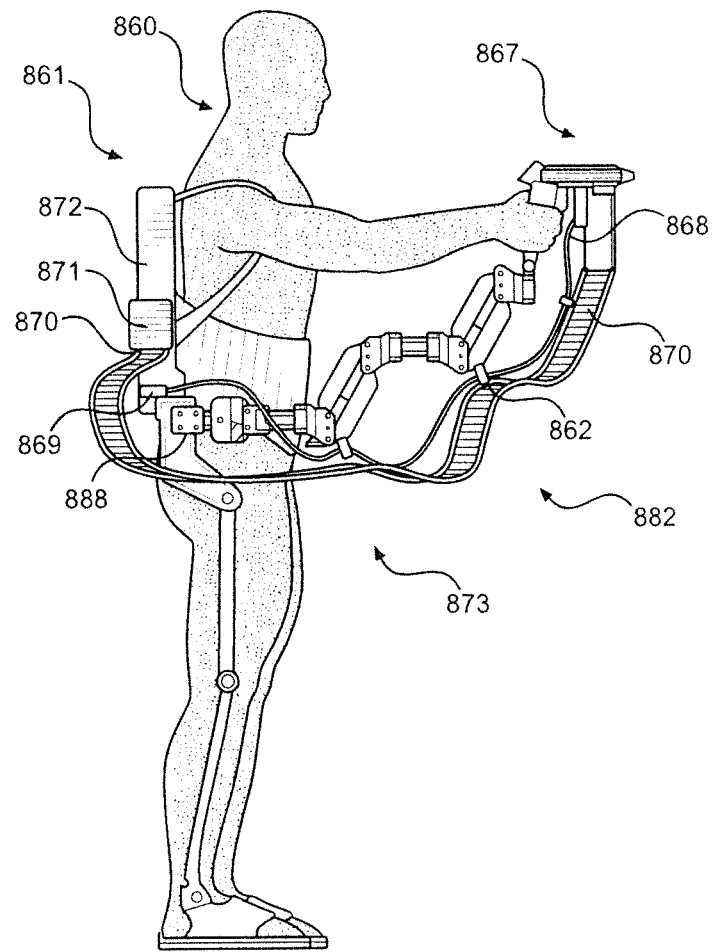
FIG. 9B is a side view of a worker wearing an exoskeleton constructed in accordance with the seventh embodiment, the exoskeleton being equipped with a hip-mounted, non-anthropomorphic tool-holding arm device and tool. The tool draws power from an energy source mounted on the structure of the exoskeleton distal to the tool, and solid consumables are fed to the tool from a storage tank mounted on the structure of the exoskeleton.

A seventh embodiment of the present invention, in which an exoskeleton supports consumables for a mounted tool, is shown in FIGS. 9A and 9B. With initial reference to FIG. 9A, a worker 840 is wearing an exoskeleton 841, with a tool 847 being mounted on a tool-supporting arm 881. Tool-supporting arm 881 is attached to the structure of exoskeleton 841 at a hip coupling 887. In this drawing, tool 847 is shown as a paint sprayer, as an example of a tool that requires a liquid consumable, with tool 847 receiving paint from a paint tank 897 through a valve 849 and a paint hose 850. Tool 847 additionally receives pressurized air from an air tank 846 through a compressed air hose 848, with both compressed air hose 848 and paint hose 850 being restrained and linked to tool-supporting arm 881 by retaining clips 852. In some embodiments, the liquid is pressurized in the tank, and pressurized liquid is delivered rather than concurrent delivery of gas and liquid. In some embodiments, the gas is delivered to the tool through a line that carries supercritical liquid (such as propane or $CO_2$) which is accumulated and evaporated at the tool for use. In some embodiments, the tool is a different device such as a cutting torch, a spray galvanizer, a pesticide sprayer, a fire extinguisher or any other device that requires liquid and/or gas consumables to operate.

FIG. 9B shows a worker 860 wearing an exoskeleton 861, with a tool 867 being mounted on a tool-supporting arm 882. Tool-supporting arm 882 is attached to the structure of exoskeleton 861 at a hip coupling 888. In this drawing, tool 867 is shown as a belt-fed rivet gun, as an example of a tool that requires solid consumables (in this case, fasteners such as rivets or nails). Rivet gun 867 receives rivets from a magazine 871, which is mounted on a rear exoskeleton structure 872 of exoskeleton 861, through a feed guide 870. Rivet gun 867 additionally receives power (either electrical or as pressurized air) from rear exoskeleton structure 872 through outlets 869 and a power conduit 868. Both feed guide 870 and power conduit 868 are restrained and linked to tool-supporting arm 882 by retaining clips 862. In some embodiments, a belt-fed tool is used that does not require power, such as fastener guns that use explosive force-driven cartridges (not unlike those seen on bullets). In some embodiments, the tool is powered by electrically ignited gas, requiring both a fuel gas feed and electrical source to the tool, in addition to the consumables feed. In some embodiments, the consumables source and/or power source for the tool act as an exoskeleton counterbalance, offsetting hip torque resulting from the tool arm and tool weight and balancing the exoskeleton.

As an example of the seventh embodiment, consider a first-responder wearing an industrial exoskeleton equipped with a tool-holding arm and a cutting torch in a search and rescue environment. Through use of the device of the seventh embodiment, the first responder would be able to bring a heavy cutting torch over uneven rubble-strewn surfaces without tangling hoses and with improved balance during tool use. This can allow for a more rapid rescue of disaster survivors.

Figure 10A:
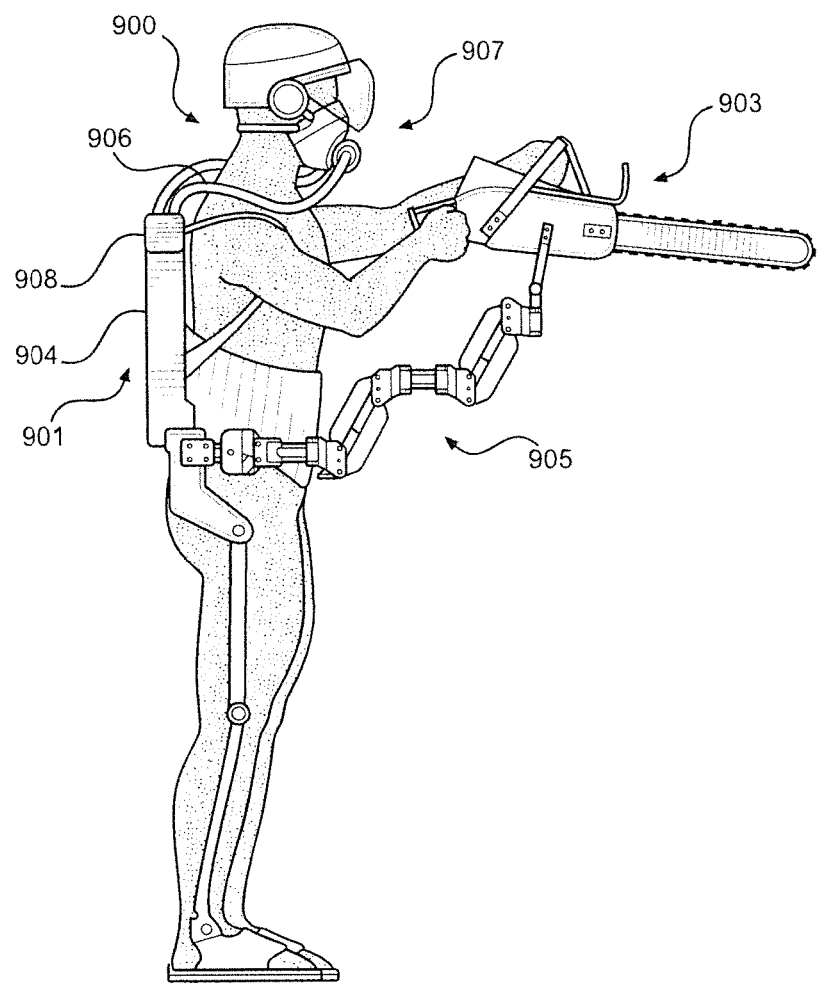
FIG. 10A is a side view of a worker wearing an exoskeleton constructed in accordance with an eighth embodiment of the present invention, the exoskeleton being equipped with a hip-mounted, non-anthropomorphic tool-holding arm device and tool. The exoskeleton provides a treated air supply to the respirator of the worker.
Figure 10B:
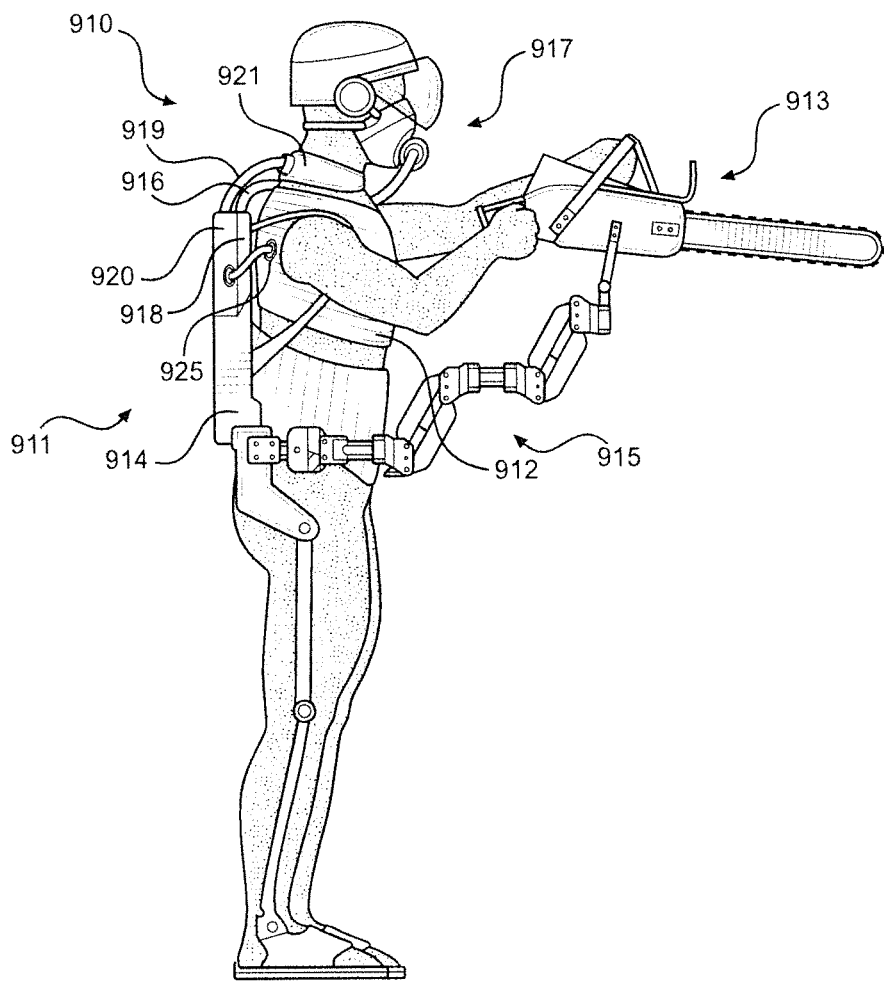
FIG. 10B is a side view of a worker wearing an exoskeleton constructed in accordance with the eighth embodiment, the exoskeleton being equipped with a hip-mounted, non-anthropomorphic tool-holding arm device and tool. The exoskeleton provides a treated air supply to the respirator of the worker and assists in the thermoregulation of the worker.

An eighth embodiment of the present invention, in which an exoskeleton provides a wearer with environmental support, including but not limited to providing a filtered air supply or thermoregulation of the wearer's body temperature, is represented in FIGS. 10A and 10B. With initial reference to FIG. 10A, a worker 900 is wearing an exoskeleton 901, with exoskeleton 901 being equipped with a tool-holding arm 905 and a tool 903. Person 900 is wearing a respirator 907, with respirator 907 receiving filtered air through an air hose 906 from an air filtration unit 908. Air filtration unit 908 is mounted on a rear structure 904 of exoskeleton 901.

In FIG. 10B, a worker 910 is wearing an exoskeleton 911, with exoskeleton 911 being equipped with a tool-holding arm 915 and a tool 913. Person 910 is wearing a respirator 917, with respirator 917 receiving filtered air through an air hose 916 from an air filtration unit 918. Air filtration unit 918 is mounted on a rear structure 914 of exoskeleton 911. Person 910 is wearing thermoregulation devices 921 and 912, with thermoregulation devices 921 and 912 receiving heating or cooling from a thermoregulation unit 920 through conduits 919 and 925, respectively. Thermoregulation unit 920 is mounted on rear structure 914 of exoskeleton 911. In some embodiments, filtered air is pressurized by a fan. In some embodiments, air filtration is passive, but the flow rate is improved relative to face-mounted respirators through use of larger surface area filtration media. In some embodiments, the exoskeleton is equipped with a hood, such as a forced air hood or a positive pressure hood, rather than a face-mounted respirator. In some embodiments, the air filtration unit is replaced by a SCUBA or rebreather apparatus, suitable for use underwater in highly toxic or oxygen-free environments. In some embodiments, the filtration system is augmented by solid or liquid phase adsorption devices. In some embodiments, the thermoregulation devices are heated by electrical resistance (as in heating blankets). In some embodiments, the thermoregulation devices are cooled by forced air flow. In some embodiments, a liquid heat exchange system is used to increase or decrease the temperature of the thermoregulation devices. In some embodiments, evaporative cooling and/or heat sinks are incorporated into the thermoregulation unit. In some embodiments, a heat pump is used. In some embodiments, the enthalpy of crystallization of a media is used to provide heating or cooling. In some embodiments, the filtered breathing air provided to the wearer is heated or cooled. In some embodiments, heating or cooling is provided to the tool, or heat is exchanged from the tool to the user (e.g., the tool, or another powered exoskeleton system, is cooled and the user is warmed through means of a liquid heat exchange system).

As an example of the eighth embodiment, consider a wildlands firefighter wearing a tool-supporting exoskeleton equipped with a chainsaw cutting a firebreak in close proximity to a wildfire on a hot summer day. Through use of the device of the eighth embodiment, the exoskeleton can provide the firefighter with a constant supply of filtered air from a powered air filtration system, with the filtration and airflow capacity being superior (in terms of flow rate and/or particulate/toxin removal) to what could be provided by a passive face-mounted respirator. The exoskeleton can also assist in reducing the temperature of the firefighter. The improvements to air flow and reductions in temperature would allow the firefighter to perform strenuous activities with reduced fatigue on the fire line, allowing for more work to be done quickly in a time-sensitive activity.

In some embodiments, the various embodiments of the present invention are combined. For example, the self-balancing tool arm of the fifth embodiment can be mounted upon an exoskeleton with the leg design of the fourth embodiment. In all embodiments, the exoskeleton can provide power to a power tool—even if the exoskeleton itself is passive and has no power requirements. In powered (i.e., actuated) exoskeleton embodiments, the power systems of the tool and exoskeleton can be shared, eliminating the need for disparate energy storage devices. In all embodiments, various sensors, including but not limited to pressure sensors or toggle switches, can be in communication with the exoskeleton control system, allowing the exoskeleton to respond to the user. In all embodiments, the exoskeleton control system can be in communication with any tool electronics or tool control systems, such as power and time settings on a spot welding gun or the remaining consumables for a tool (e.g., nails for a nail gun). The exoskeleton wearer can access these communications or issue commands through a user interface that is in communication with the exoskeleton control system.

Based on the above, it should be readily apparent that the present invention provides a range of devices and methods that allow the use of powered devices on human exoskeletons for functions other than exoskeleton joint actuation, with these devices improving the utility of the tool-holding exoskeleton to the wearer. The present invention also provides a device and method that allows for the automatic and rapid adjustment of a gravity-compensating tool-holding arm in response to the changing of a supported tool or tool weight. The present invention further provides a device and method that allows for a tool-holding arm to be locked into a fixed position, allowing the wearer to lean into the tool and apply greater force into the tool. The present invention further provides a device and method that allows for the changing of the position of an exoskeleton counterbalance/outrigger, improving the balance of the exoskeleton. The present invention further provides a device and method that allows for improved walking mobility in exoskeletons equipped with hip torque-counteracting devices. The present invention further provides a device and method that allows for an exoskeleton to supply power directly to supported tools. The present invention further provides a device and method that allows an exoskeleton to supply consumables, such as fasteners, directly to tools. The present invention further provides a device and method that allows for an exoskeleton to regulate the temperature of the exoskeleton wearer. Although described with reference to preferred embodiments, it should be readily understood that various changes or modifications could be made to the invention without departing from the spirit thereof. In general, the invention is only intended to be limited by the scope of the following claims.

The invention claimed is:

1. A tool-holding arm incorporated into an exoskeleton including: a hip structure; a thigh link coupled to the hip structure at a hip joint; a shank link coupled to the thigh link at a knee joint; a foot structure coupled to the shank link at an ankle joint, wherein, when the exoskeleton is supported on a support surface, a weight of the exoskeleton is transferred from the hip structure to the support surface through the thigh link, shank link and foot structure; and an electronic control system, said tool-holding arm comprising:
  a plurality of links;
  a tool coupling configured to removably secure a tool to the tool-holding arm;
  a first fluid spring configured to provide a gravity-counteracting force to the tool-holding arm; and
  at least one of:
  a) a locking mechanism configured to lock the first fluid spring; and
  b) an adjustment mechanism configured to adjust an amount of the gravity-counteracting force provided by the first fluid spring,
wherein the electronic control system of the exoskeleton is configured to control the at least one of the locking mechanism and the adjustment mechanism.

2. The tool-holding arm of claim 1, wherein:
  the first fluid spring is a hydraulic or pneumatic spring; and
  the first fluid spring includes a first rod, a first plunger and a first cylinder.

3. The tool-holding arm of claim 2, wherein the tool-holding arm includes the locking mechanism.

4. The tool-holding arm of claim 3, wherein the locking mechanism is a valve, the valve being configured to control a flow of a fluid into and out of the first cylinder.

5. The tool-holding arm of claim 2, wherein the tool-holding arm includes the adjustment mechanism.

6. The tool-holding arm of claim 5, wherein the adjustment mechanism includes:
  a second rod;
  a second plunger;
  a second cylinder; and
  a fluid conduit configured to transfer a fluid between the second cylinder and the first cylinder, wherein a position of the second plunger within the second cylinder determines the amount of the gravity-counteracting force provided by the first fluid spring.

7. The tool-holding arm of claim 6, wherein the tool-holding arm further includes the locking mechanism, and wherein the locking mechanism is a valve, the valve being configured to control a flow of the fluid within the fluid conduit.

8. The tool-holding arm of claim 4 wherein:
  the valve includes a stem and a seat;
  when the stem contacts the seat, the valve is in a closed position in which the valve prevents the fluid from flowing into and out of the first fluid spring; and when the stem does not contact the seat, the valve is in a fully or partially open position in which the valve does not prevent the fluid from flowing into and out of the first fluid spring.

9. The tool-holding arm of claim 6, further comprising a second fluid spring configured to provide the gravity-counteracting force to the tool-holding arm, wherein:
the second fluid spring includes a third rod, a third plunger and a third cylinder;
the fluid conduit is further configured to transfer the fluid between the second cylinder and the third cylinder; and
the position of the second plunger within the second cylinder determines the amount of the gravity-counteracting force provided by the second fluid spring.

10. The tool-holding arm of claim 6, wherein the adjustment mechanism further includes a motor configured to control the position of the second plunger within the second cylinder.

11. The tool-holding arm of claim 6, further comprising a valve configured to control a flow of the fluid within the fluid conduit.

12. The tool-holding arm of claim 2, further comprising a tensioning spring, wherein the first fluid spring is located within the tensioning spring.

13. An exoskeleton comprising:
a hip structure;
a thigh link coupled to the hip structure at a hip joint;
a shank link coupled to the thigh link at a knee joint;
a foot structure coupled to the shank link at an ankle joint, wherein, when the exoskeleton is supported on a support surface, a weight of the exoskeleton is transferred from the hip structure to the support surface through the thigh link, shank link and foot structure;
an electronic control system; and
a tool holding arm, wherein the tool holding arm includes:
a plurality of links;
a tool coupling configured to removably secure a tool to the tool-holding arm;
a first fluid spring configured to provide a gravity-counteracting force to the tool-holding arm; and
at least one of:
a) a locking mechanism configured to lock the first fluid spring; and
b) an adjustment mechanism configured to adjust an amount of the gravity-counteracting force provided by the first fluid spring,
wherein the electronic control system of the exoskeleton is configured to control the at least one of the locking mechanism and the adjustment mechanism.

14. The exoskeleton of claim 13, wherein the tool-holding arm includes the locking mechanism.

15. The exoskeleton of claim 13, wherein the tool-holding arm includes the adjustment mechanism and:
the exoskeleton further includes a rear structure;
when the exoskeleton is worn by a user, the rear structure is located behind the user; and
the adjustment mechanism is coupled to the rear structure.

16. The exoskeleton of claim 13, wherein the tool-holding arm includes both the locking mechanism and the adjustment mechanism, with the electronic control system configured to control both the locking mechanism and the adjustment mechanism.

17. A method of controlling a tool-holding arm incorporated into an exoskeleton including hip structure, a thigh link coupled to the hip structure at a hip joint, a shank link coupled to the thigh link at a knee joint, foot structure coupled to the shank link at an ankle joint and an electronic control system for selectively moving the exoskeleton, said tool-holding arm including a plurality of links, a tool coupling configured to removably secure a tool to the tool-holding arm and a first fluid spring configured to provide a gravity-counteracting force to the tool-holding arm, said method comprising at least one of: a) locking the first fluid spring with a locking mechanism of the tool-holding arm; and b) adjusting an amount of the gravity-counteracting force being provided by the first fluid spring through an adjustment mechanism of the tool-holding arm, and wherein the method further comprises: controlling the at least one of the locking mechanism and the adjustment mechanism through the electronic control system of the exoskeleton.

18. The method of claim 17, wherein the first fluid spring is a hydraulic or pneumatic spring including a first rod, a first plunger and a first cylinder and the method further comprises: altering a flow of a fluid into and out of the first cylinder in locking the first fluid spring.

19. The method of claim 17, wherein the first fluid spring is a hydraulic or pneumatic spring including a first rod, a first plunger and a first cylinder, the tool-holding arm includes a second rod, a second plunger and a second cylinder, and the method further comprises: altering a flow of a fluid between the second cylinder and the first cylinder in adjusting the amount of gravity-counteracting force provided by the first fluid spring.

20. The method of claim 17, wherein both the locking mechanism and the adjustment mechanism are controlled through the electronic control system of the exoskeleton.

\* \* \* \* \*